(12) United States Patent
Sudou et al.

(10) Patent No.: US 8,860,662 B2
(45) Date of Patent: Oct. 14, 2014

(54) ELECTRONIC DEVICE

(75) Inventors: Tomohiro Sudou, Kanagawa (JP);
Hiroyuki Bamba, Kanagawa (JP); Nayu Noumachi, Kanagawa (JP); Natsuhito Honda, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 122 days.

(21) Appl. No.: 13/578,760

(22) PCT Filed: Feb. 15, 2011

(86) PCT No.: PCT/JP2011/053716
§ 371 (c)(1),
(2), (4) Date: Aug. 13, 2012

(87) PCT Pub. No.: WO2011/099632
PCT Pub. Date: Aug. 18, 2011

(65) Prior Publication Data
US 2013/0057477 A1 Mar. 7, 2013

(30) Foreign Application Priority Data

Feb. 15, 2010 (JP) .................................. 2010-030737
Mar. 29, 2010 (JP) .................................. 2010-074603

(51) Int. Cl.
*G09G 5/00* (2006.01)
*G06F 3/0489* (2013.01)
*G06F 3/0488* (2013.01)
*G06F 3/023* (2006.01)
*G06F 3/01* (2006.01)

(52) U.S. Cl.
CPC ............ *G06F 3/0233* (2013.01); *G06F 3/0489* (2013.01); *G06F 3/04886* (2013.01); *G06F 3/0236* (2013.01); *G06F 3/04892* (2013.01); *G06F 3/018* (2013.01)
USPC .......................................... 345/156; 345/169

(58) Field of Classification Search
None
See application file for complete search history.

(56) References Cited

U.S. PATENT DOCUMENTS

2007/0296704 A1* 12/2007 Park et al. .................... 345/169

FOREIGN PATENT DOCUMENTS

| JP | 2002-163068 |   | 6/2002 |
|----|-------------|---|--------|
| JP | 2003-108298 | A | 4/2003 |
| JP | 2004-220618 | A | 8/2004 |
| JP | 2009-32209  | A | 2/2009 |
| JP | 2009-064236 |   | 3/2009 |

OTHER PUBLICATIONS

International Search Report issued for International Application No. PCT/JP2011/053176, mailed on May 17, 2011.
Notice of Reasons for Rejection issued to JP Application No. 2010-030737, mailed Dec. 17, 2013, 3 pages.

* cited by examiner

*Primary Examiner* — Joseph Haley
(74) *Attorney, Agent, or Firm* — Hoffmann & Baron, LLP

(57) ABSTRACT

Disclosed is an electronic device that makes it easy to input desired characters using a directional key. Also disclosed is a display control method for an electronic device. The disclosed electronic device is provided with a display unit (21), a user input unit (11) that can specify a plurality of directions, and a control unit (45). If one of the plurality of directions is specified via the user input unit (11) while characters and numbers are being displayed on the display unit (21), the control unit selects different characters and different numbers for changing the characters and/or numbers displayed on the display unit (21) to other characters and numbers. The control unit then has the display unit (21) display the selected other characters and numbers.

10 Claims, 16 Drawing Sheets

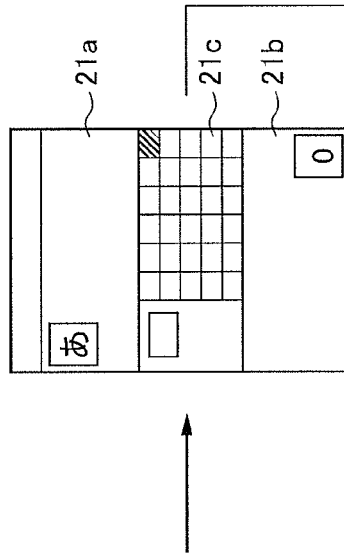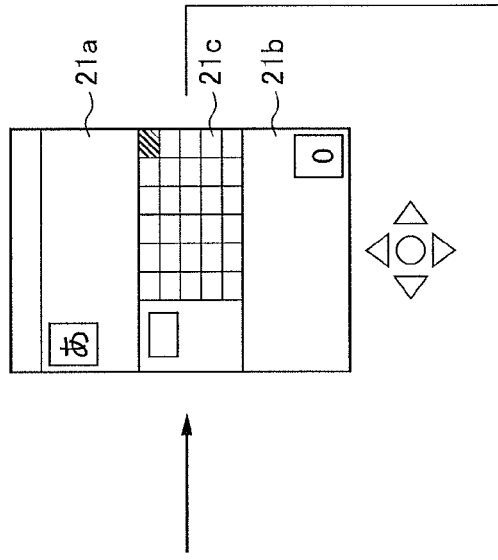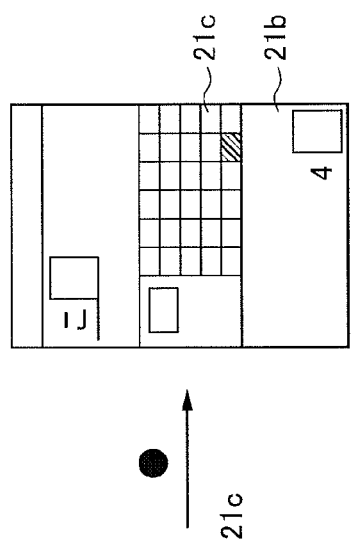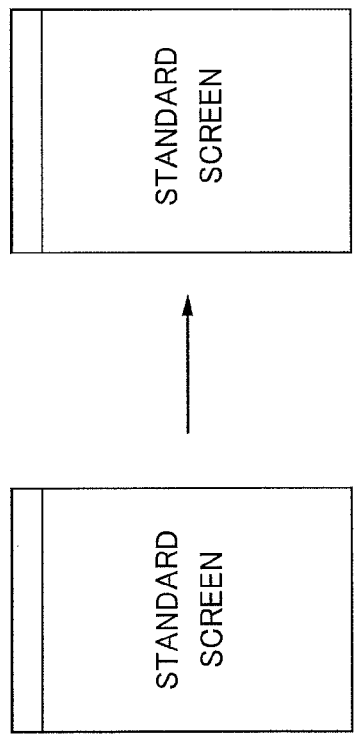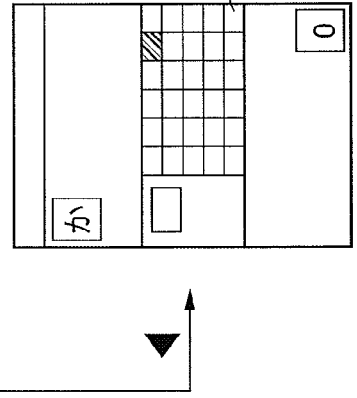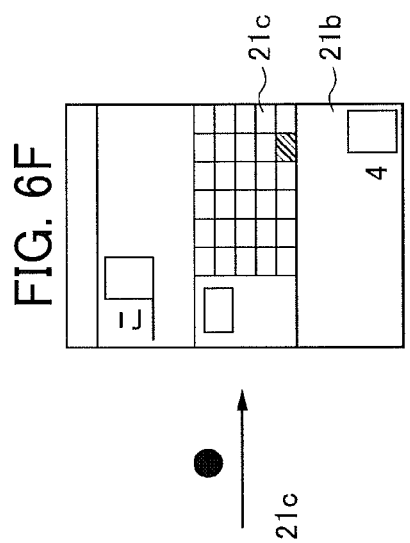

FIG. 9A
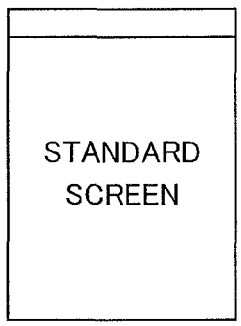
STANDARD SCREEN
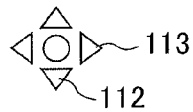
▷ KEY INPUT
FIG. 9B
▽ ~ ▽ KEY INPUT
FIG. 9C
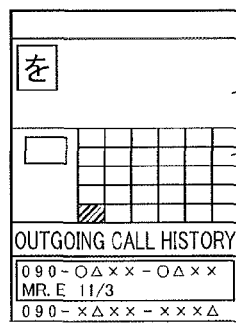
▽ ~ ▽ KEY INPUT
FIG. 9D
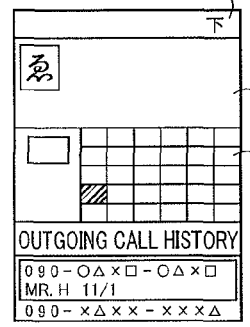
▽ ~ ▽ KEY INPUT
FIG. 9E
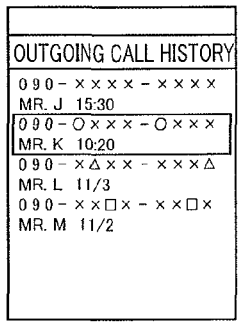

FIG. 10A
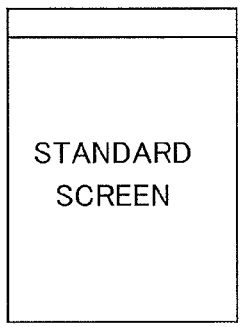
STANDARD SCREEN
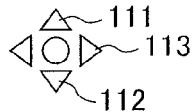
▷ KEY INPUT
FIG. 10B
わ
21a
21c
OUTGOING CALL HISTORY
090-××××-××××
MR. A 15:30
090-O×××-O×××
▽ KEY INPUT →
FIG. 10C
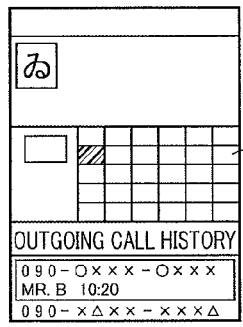
ゐ
21c
OUTGOING CALL HISTORY
090-O×××-O×××
MR. B 10:20
090-×△××-×××△
OUTGOING CALL KEY INPUT →
FIG. 10D
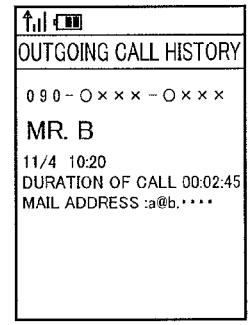
OUTGOING CALL HISTORY
090-O×××-O×××
MR. B
11/4 10:20
DURATION OF CALL 00:02:45
MAIL ADDRESS :a@b.····
▷ キー入力
FIG. 10E
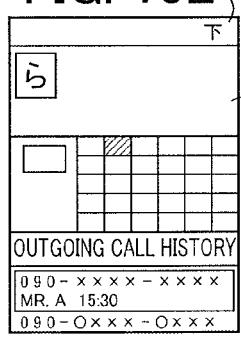
21e
下
ら
21a
OUTGOING CALL HISTORY
090-××××-××××
MR. A 15:30
090-O×××-O×××
▷ KEY INPUT →
FIG. 10F
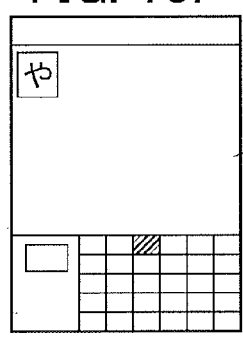
や
21a

▷ KEY INPUT

CONVERT  SELECT
     OUTGOING CALL 1 (CONVERT)

3 (OUTGOING CALL)

2 (SELECT)

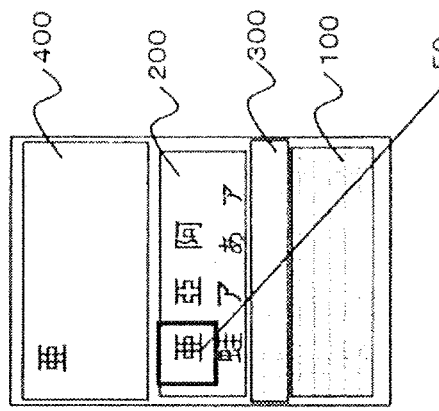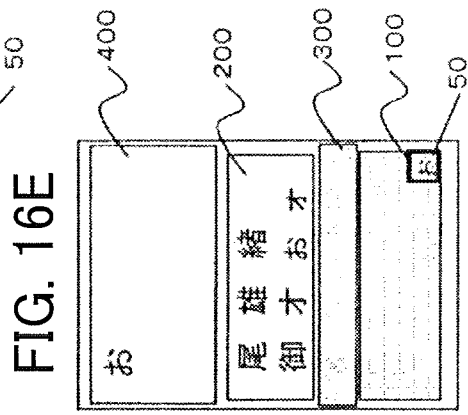
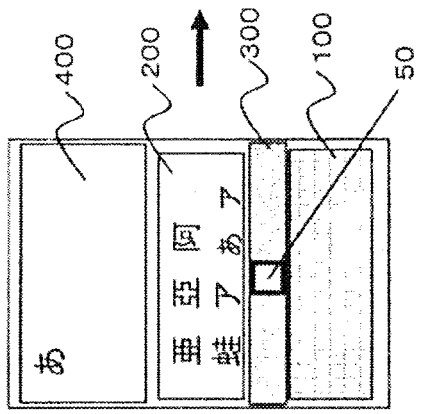
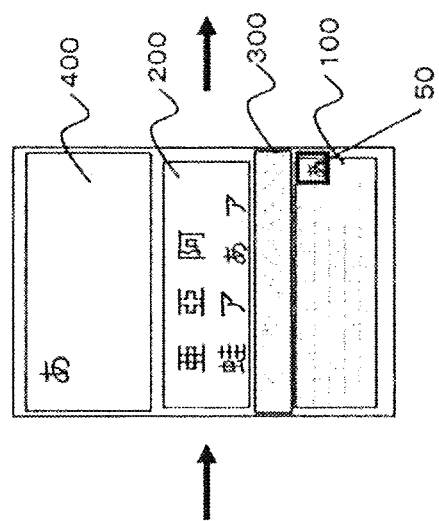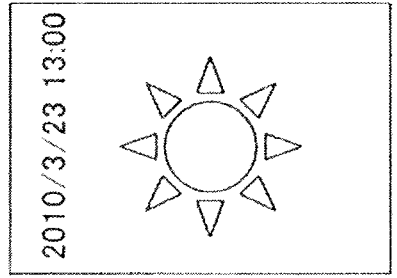

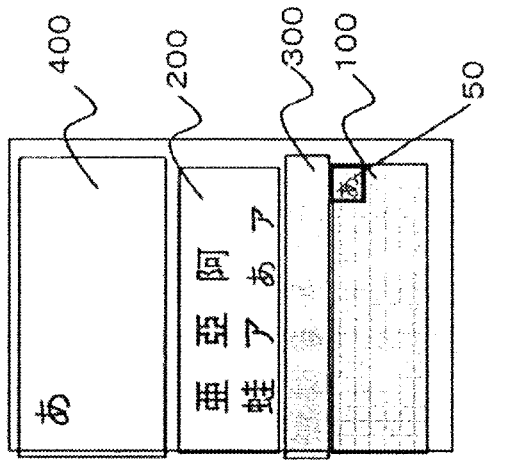
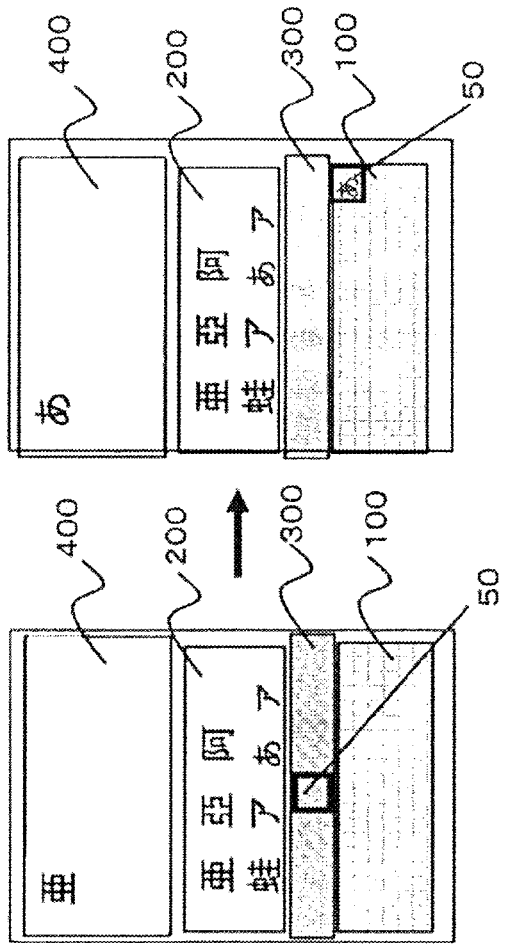
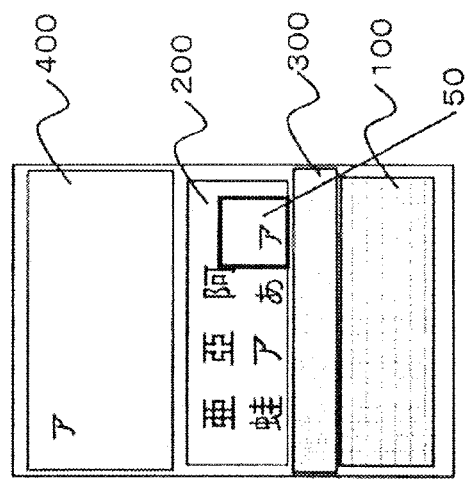
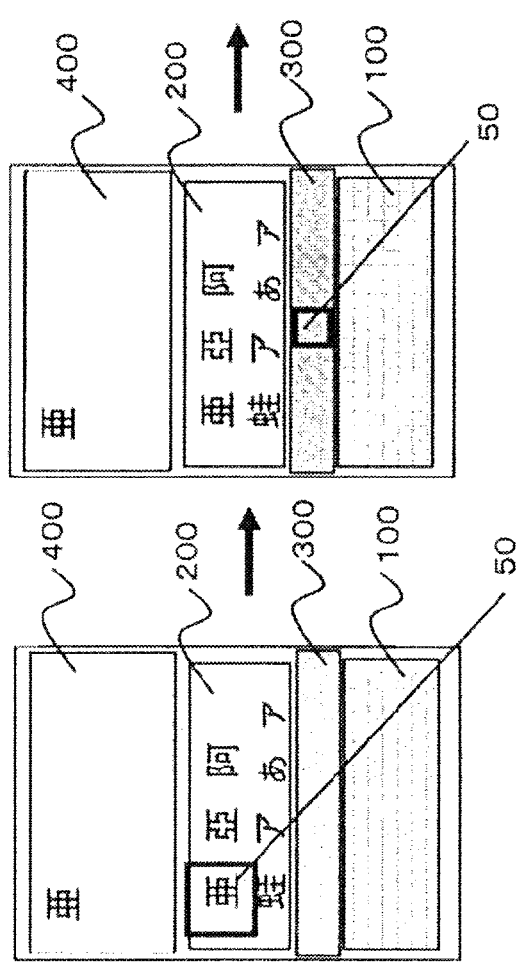

ELECTRONIC DEVICE

CROSS-REFERENCE TO RELATED APPLICATIONS:

This application is the National Stage of International Application No. PCT/JP2011/053176, filed Feb. 15, 2011, which claims the benefit of Japanese Application Nos. 2010-030737, filed Feb. 15, 2010, and 2010-074603, filed Mar. 29, 2010, the entire contents of all of which are incorporated by reference herein.

FIELD OF THE INVENTION

The present invention relates to an electronic device capable of inputting characters.

BACKGROUND OF THE INVENTION

Some electronic devices such as mobile telephone devices include: an operation unit with input keys for inputting non-numeric characters and numeric characters; and a display unit for displaying the non-numeric characters and the numeric characters that are input by operating the input keys. With such electronic devices, in a case in which the input key is operated in a state where a standard screen is displayed on the display unit, a non-numeric character and a numeric character assigned to the input key thus operated can be concurrently input (see Patent Document 1). The standard screen is a screen that is displayed in a standby state for an operation of the input keys or the like, in which other applications are not running. The standard screen is also referred to as an idle screen, an initial screen, a wall paper screen or a desktop screen.

Among electronic devices, for example, a gaming machine does not include a full keyboard that is provided to a personal computer and the like, and a 10-key keyboard that is provided to a mobile telephone device and the like. In a case of such an electronic device without a 10-key keyboard and a full keyboard, a character is input by using a direction designation key such as a cross key (see Patent Document 2).

Patent Document 1: Japanese Unexamined Patent Application, Publication No. 2009-32209
Patent Document 2: Japanese Unexamined Patent Application, Publication No. 2003-108298

SUMMARY OF THE INVENTION

Problems to be Solved by the Invention

With an electronic device disclosed in Patent Document 1, by operating an input key for inputting a non-numeric character and a numeric character, the non-numeric character and the numeric character assigned to the input key thus operated are input. Therefore, with the aforementioned electronic device, even in a case of operating a key (for example, a direction designation key for designating a direction) other than the input keys for inputting non-numeric characters and numeric characters, a non-numeric character and a numeric character cannot be input.

With an electronic device disclosed in Patent Document 2, in a case of inputting characters by using direction designation keys, since the number of such keys for inputting characters is limited, a problem as follows has been suffered. For example, in a case in which a user of the aforementioned electronic device selects a character from a character palette for displaying characters that can be input, and inputs a desired character by using a conversion candidate or a predictive candidate for the character, the user had to separately use the inputting using the character palette with the direction designation keys, and the inputting using the predictive candidate or the conversion candidate; therefore, the operation has been complicated.

An object of the invention is to provide an electronic device capable of easily inputting at least a desired character, based on an operation of direction designation keys.

Means for Solving the Problems

The electronic device according to the present invention includes: a display unit; an operation unit capable of designating a plurality of directions; and a control unit. In a state where a non-numeric character and a numeric character are displayed on the display unit, in a case in which any direction is designated by the operation unit, the control unit selects an other non-numeric character and an other numeric character for changing at least one of the non-numeric character and the numeric character displayed on the display unit to the other non-numeric character and the other numeric character, respectively, and causes the display unit to display the other non-numeric character and the other numeric character thus selected.

It is preferable for the operation unit to be capable of designating a first direction, a second direction that is a direction opposite to the first direction, a third direction that is a direction transverse to the first direction, and a fourth direction that is a direction opposite to the third direction. In a state where the non-numeric character and the numeric character are displayed on the display unit, in a case in which the first direction or the second direction is designated by the operation unit, it is preferable for the control unit to select an other non-numeric character and an other numeric character for changing the non-numeric character and the numeric character displayed on the display unit to the other non-numeric character and the other numeric character, respectively, and to cause the display unit to display the other non-numeric character and the other numeric character thus selected. In a state where the non-numeric character and the numeric character are displayed on the display unit, in a case in which the third direction or the fourth direction is designated by the operation unit, it is preferable for the control unit to select an other non-numeric character for changing the non-numeric character displayed on the display unit to the other non-numeric character, to cause the display unit to display the other non-numeric character thus selected, and to maintain displaying of the numeric character as displayed on the display unit.

In a case in which the non-numeric character and the numeric character are displayed on the display unit, it is preferable for the control unit to cause the display unit to display a non-numeric character input area for displaying the non-numeric character, and a numeric character input area for displaying the numeric character, and in a case in which the third direction or the fourth direction is designated by the operation unit, it is preferable for the control unit to maintain displaying of the non-numeric character input area for displaying the non-numeric character as well as the non-numeric character thus displayed, and to cancel displaying of the numeric character input area for displaying the numeric character as well as the numeric character thus displayed.

It is preferable for a non-numeric character and a numeric character to be associated with each direction that can be designated by the operation unit, and in a case in which any direction is designated by the operation unit, it is preferable for the control unit to cause the display unit to display at least one of a non-numeric character and a numeric character associated with the direction thus designated.

It is preferable for a predetermined function to be assigned to each direction that can be designated by the operation unit. In a case in which any direction is designated by the operation unit, it is preferable for the control unit to cause the display unit to perform displaying based on a predetermined function assigned to the direction thus designated, and to display at least one of a non-numeric character and a numeric character associated with the direction thus designated. In a state where the displaying based on the predetermined function is performed, and at least one of the non-numeric character and the numeric character is displayed on the display unit, in a case in which any direction is further designated by the operation unit, it is preferable for the control unit to select an other non-numeric character and an other numeric character for changing at least one of the non-numeric character and the numeric character displayed on the display unit to the other non-numeric character and the other numeric character, respectively, and to cause the display unit to display the other non-numeric character and the other numeric character thus selected, or to select a display item based on the predetermined function.

In a state where a standard screen is displayed on the display unit, in a case in which any direction is designated by the operation unit, it is preferable for the control unit to cause the display unit to display a non-numeric character and a numeric character associated with the direction thus designated, and a non-numeric character palette composed of a plurality of non-numeric characters used for changing a non-numeric character to an other non-numeric character.

It is preferable for a non-numeric character, a numeric character and a predetermined function to be associated with each direction that can be designated by the operation unit. In a state where a standard screen is displayed on the display unit, in a case in which any direction is designated by the operation unit, it is preferable for the control unit to cause the display unit to perform displaying based on a non-numeric character, a numeric character and a predetermined function associated with the direction thus designated.

The electronic device according to the present invention includes: an operation unit capable of designating a plurality of directions, and performing a determination operation; a display unit that displays: a first area for displaying a plurality of characters that can be selected as input characters; a second area for displaying a predictive candidate or a conversion candidate for the characters thus input; and a third area that is adjacent to the first area and the second area; and a control unit. In a state where a character displayed in the first area is selected, in a case in which there is no character in a direction designated by operating the operation unit, the control unit selects the third area. In a state where the third area is selected, in a case in which a determination operation is performed by the operation unit, the control unit selects the second area or the conversion candidate or the prediction candidate displayed in the second area, and in a case in which any direction is designated by the operation unit, the control unit selects the first area or the character displayed in the first area.

The electronic device according to the present invention includes: an operation unit capable of designating a plurality of directions, and performing a determination operation; a display unit that displays: a first area for displaying a plurality of characters that can be selected as input characters; a second area for displaying a predictive candidate or a conversion candidate for the characters thus input; and a third area that is adjacent to the first area and the second area; and a control unit. In a state where a character displayed in the first area is selected, in a case in which there is no character in a direction designated by operating the operation unit, the control unit selects the third area. In a state where the third area is selected, in a case in which a determination operation is performed by the operation unit, the control unit selects the first area or the character displayed in the first area, and in a case in which any direction is designated by the operation unit, the control unit selects the second area or the conversion candidate or the prediction candidate displayed in the second area.

In a state where the conversion candidate or the predictive candidate displayed in the second area is selected, in a case in which there is no conversion candidate or predictive candidate in a direction designated by operating the operation unit, it is preferable for the control unit to select the third area.

It is preferable for a character palette for displaying characters of a Japanese syllabary based on vowels and consonants to be displayed in the first area. In a case in which the character displayed in the first area is selected after selecting the third area, it is preferable for the control unit to select a character, which has a vowel or consonant identical to that of a character selected in the first area immediately before selecting the third area, and which is different from the character that was selected.

It is preferable for a character to be associated with each direction that can be designated by the operation unit. In a state where a standard screen is displayed on the display unit, in a case in which any direction is designated by the operation unit, it is preferable for the control unit to cause the display unit to display a character associated with the direction thus designated.

Effects of The Invention

According to the invention, a desired character can be easily input, based on an operation of direction designation keys.

BRIEF DESCRIPTION OF THE DRAWINGS

FIG. 6 is a diagram for illustrating screen transition in the first operation of the mobile telephone device;

FIG. 9 is a first diagram for illustrating screen transition in a fourth operation of the mobile telephone device;

FIG. 10 is a second diagram for illustrating screen transition in the fourth operation of the mobile telephone device;

FIG. 16 is a diagram for illustrating screen transition in a sixth operation according to the present invention; and FIG. 17 is a diagram for illustrating screen transition in a seventh operation according to the present invention.

Figure 1:
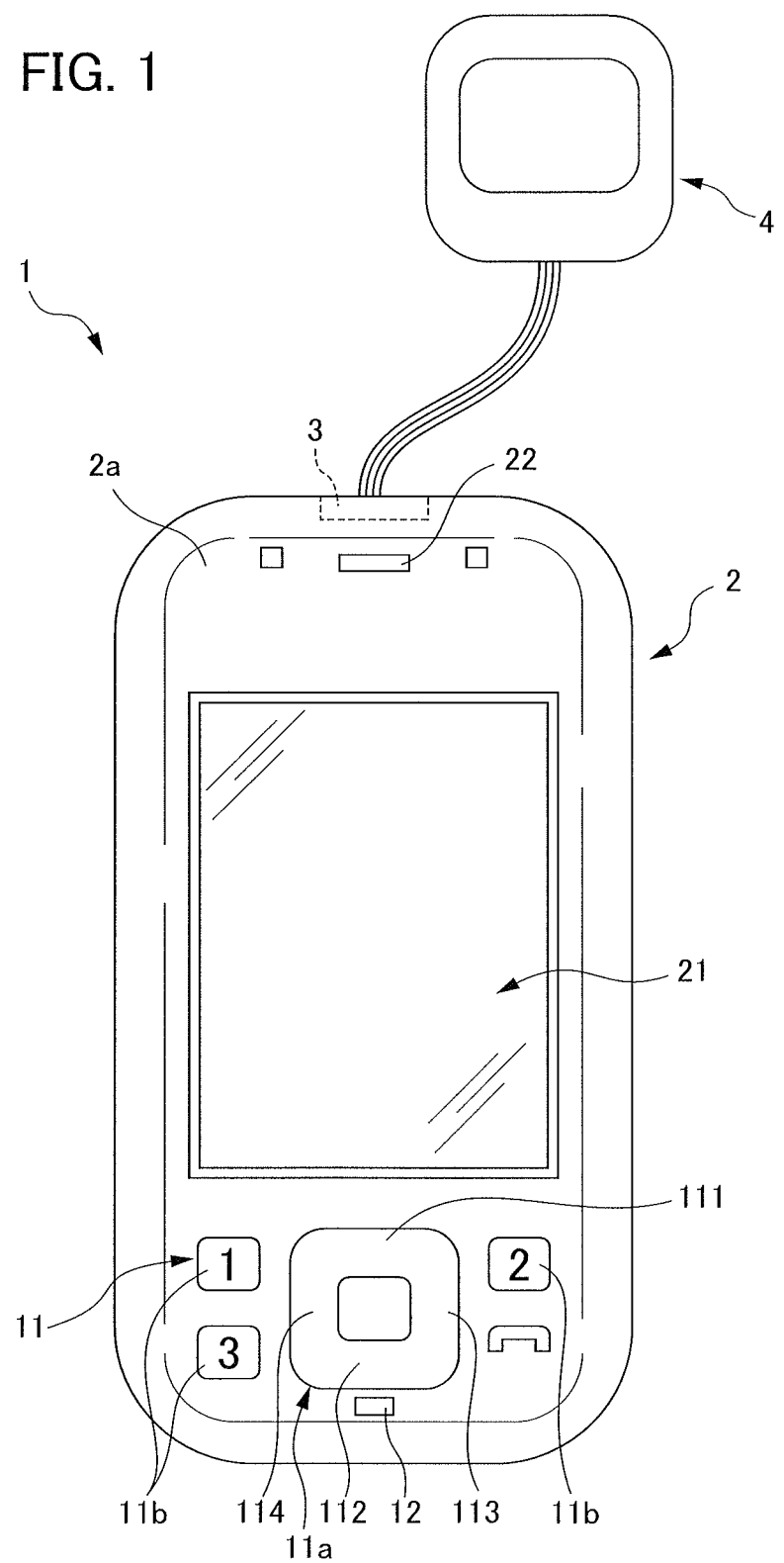
FIG. 1 is a perspective view showing an appearance of a mobile telephone device according to a first embodiment of an electronic device.

EXPLANATION OF REFERENCE NUMERALS 1 mobile telephone device (electronic device)
11 operation unit
11a direction designation key
11b function activation key
11c determination key
12 microphone
21 display unit
22 speaker
23 driver IC
40 main antenna
41 RF circuit unit
42 image processing unit
43 sound processing unit
44 memory
45 control unit
50 cursor
100 first area
200 second area
300 third area
400 character input area

DETAILED DESCRIPTION OF THE INVENTION

Descriptions are hereinafter provided for the best mode for carrying out the present invention with reference to the drawings.

First Embodiment

First of all, with reference to FIG. 1, descriptions are provided for a basic structure of a mobile telephone device 1 according to a first embodiment of the electronic device of the present invention. FIG. 1 is a perspective view showing an appearance of the mobile telephone device 1 according to the first embodiment of the electronic device.

The mobile telephone device 1 is a mobile telephone device of a straight type. An external shape of the mobile telephone device 1 is mainly configured with: a case 2; a removable member 3 that is removably attached to the case 2; and a strap 4 that is connected to the removable member 3. The mobile telephone device 1 has a security alarm function, in addition to a telephone call function. The security alarm function is a function to draw attention of people around a user by operating the mobile telephone device 1 to generate sound at full blast, in a case in which the user sensed danger.

An operation unit 11, a display unit 21, a microphone 12 and a speaker 22 are disposed on a front face 2a of the case 2.

The operation unit 11 includes a plurality of direction designation keys 11a (direction designating means) for designating distinct directions, and a function activation key 11b for activating a predetermined function. Here, even in a case in which the plurality of direction designation keys 11a are physically composed of a single key as shown in FIG. 1, such a key is assumed to be a plurality of direction designation keys as long as different functions are assigned to upper, right, lower and left directions, respectively. More specifically, such a key may be capable of designating a plurality of directions, and may be a joystick, a track ball, or other pointing devices. Detection through a capacitive sensor or an infrared sensor may be employed to enable designation of a plurality of directions.

In the present invention, the direction designation keys 11a of the operation unit 11 perform not only a direction designation operation and a scroll operation in upper, lower, left and right directions, but also an input operation of symbols including numeric characters, non-numeric characters, alphabetic characters and the like. Here, the present invention assumes that a numeric character includes not only a single numeric character but also a numeric character string, a character includes not only a single character but also a character string, an alphabetic character includes not only a single alphabetic character but also an alphabetic character string, and a symbol includes not only a single symbol but also a symbol string. The direction designation keys 11a include an upper key 111 capable of designating the upper direction, a lower key 112 capable of designating the lower direction, a right key 113 capable of designating the right direction, and a left key 114 capable of designating the left direction.

Characters include non-numeric characters other than numeric characters, such as, for example, hiragana characters, katakana characters, alphabetic characters, symbols and the like.

The display unit 21 is composed of a liquid crystal display, an organic EL (electroluminescence) display or the like. The microphone 12 inputs sound produced by the user of the mobile telephone device 1 during a telephone call. The speaker 22 outputs sound of the other party of a telephone call when using the mobile telephone device 1.

The mobile telephone device is not limited to the mobile telephone device 1 of the straight type described above. In other words, the mobile telephone device may be of: a slider type in which one case slides to one direction from a state in which the operation unit side case and the display unit side case are mutually superimposed; a rotating type in which one case is rotated around an axis line along the superimposing direction; a type in which the display unit side case and the operation unit side case are connected via a 2-axis hinge; or a flip type in which the display unit side case and the operation unit side case are connected via a hinge mechanism.

Figure 2:
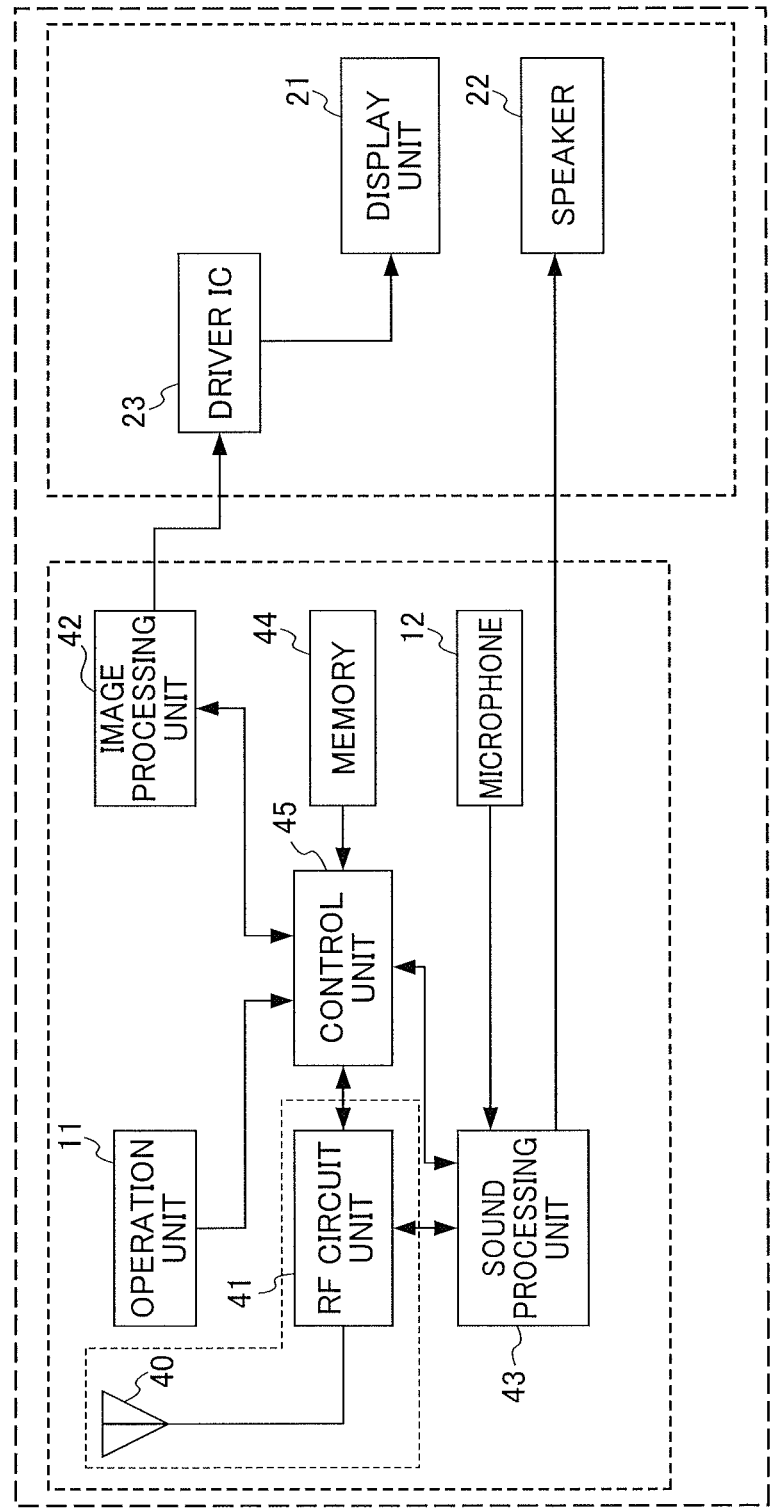
FIG. 2 is a functional block diagram showing functions of the mobile telephone device according to the first embodiment.

Next, descriptions are provided for a functional configuration of the mobile telephone device 1. FIG. 2 is a functional block diagram showing functions of the mobile telephone device 1. The mobile telephone device 1 includes: the operation unit 11, the microphone 12, a main antenna 40, an RF circuit unit 41, an image processing unit 42, a sound processing unit 43, memory 44, the control unit 45, the display unit 21, the speaker 22, and a driver IC 23. The configurations of the operation unit 11, the display unit 21, the microphone 12 and the speaker 22 are as described above.

The main antenna 40 is configured to communicate with external devices such as base stations via a predetermined usable frequency band (for example, 800 MHz band). Although 800 MHz is set as the predetermined usable frequency band in the present embodiment, other frequency bands can also be used.

The RF circuit unit 41 executes demodulation processing on a signal received via the main antenna 40, and transmits the processed signal to the control unit 45. The RF circuit unit 41 executes modulation processing on a signal transmitted from the control unit 45, and transmits the signal to external devices via the main antenna 40. On the other hand, the RF circuit unit 41 notifies the control unit 45 of the intensity of a signal received via the main antenna 40.

The image processing unit 42 executes predetermined image processing, and outputs the processed image data to the driver IC 23, in accordance with control by the control unit 45. When the image data is transmitted from the image processing unit 42, the driver IC 23 stores the image data in frame memory, and outputs the image data to the display unit 21 at predetermined timing.

The sound processing unit 43 executes predetermined sound processing on a signal transmitted from the RF circuit unit 41, and outputs the processed signal to the speaker 22, in accordance with control by the control unit 45. The speaker 22 externally outputs the signal that is transmitted from the sound processing unit 43.

When a signal is input from the microphone 12, the sound processing unit 43 processes the signal, and outputs the processed signal to the RF circuit unit 41, in accordance with control by the control unit 45. The RF circuit unit 41 executes predetermined processing on the signal transmitted from the sound processing unit 43, and outputs the processed signal to the main antenna 40.

The memory 44 includes, for example, working memory, and is utilized for arithmetic processing by the control unit 45. The memory 44 stores a plurality of applications as well as various tables and the like that are required by the applications. The memory 44 may also serve as detachable external memory.

The control unit 45 controls the entirety of the mobile telephone device 1, and is configured to employ a central processing unit (CPU) and the like.

The mobile telephone device 1 as thus constituted has a function capable of concurrently inputting a non-numeric character and a numeric character, based on an operation of the direction designation keys 11*a*.

Descriptions are hereinafter provided for a configuration and operations for achieving the aforementioned function according to the mobile telephone device 1.

In a case in which a predetermined operation is performed via the operation unit 11, the control unit 45 causes the display unit 21 to display a non-numeric character and a numeric character. In a state where a non-numeric character and a numeric character are displayed on the display unit 21, in a case in which any key of the direction designation keys 11*a* is further operated (in a case in which any direction is designated by the direction designation key 11*a*), the control unit 45 selects an other non-numeric character and an other numeric character for changing at least one of the non-numeric character and the numeric character displayed on the display unit 21 to the other non-numeric character and the other numeric character, respectively, and causes the display unit 21 to display the other non-numeric character and the other numeric character thus selected. Here, the predetermined operation via the operation unit 11 may be an operation of a key for activating a screen for editing non-numeric characters and numeric characters, or may be an operation of any key of the direction designation keys 11*a* as will be described later.

More specifically, in a case in which any key of the direction designation keys 11*a* is operated, the control unit 45 causes the display unit 21 to display, for example, a hiragana character "a" and a numeric character "0". A non-numeric character and a numeric character to be displayed when operating a key are any non-numeric character and any numeric character, or a preset non-numeric character and a preset numeric character. In a state where the hiragana character "a" and the numeric character "0" are displayed on the display unit 21, in a case in which any key of the direction designation keys 11*a* is further operated, and selection is performed to change at least one of the hiragana character "a" and the numeric character "0" to an other non-numeric character (for example, a hiragana character "i") and an other numeric character (for example, a numeric character "1"), respectively, the control unit 45 causes the display unit 21 to display the other hiragana character "i" and the other numeric character "1" thus selected.

As a result, with the mobile telephone device 1, in a case in which any key of the direction designation keys 11*a* is operated, the display unit 21 displays a non-numeric character and a numeric character, and in a case in which any key of the direction designation keys 11*a* is further operated, at least one of the non-numeric character and the numeric character displayed on the display unit 21 is changed to an other non-numeric character and an other numeric character, respectively, and the display unit 21 displays the other non-numeric character and the other numeric character; therefore, at least one of a non-numeric character and a numeric character can be input, based on an operation of the direction designation keys 11*a*.

The direction designation keys 11*a* include: a first key capable of designating a first direction; a second key capable of designating a second direction that is a direction opposite to the first direction; a third key capable of designating a third direction that is a direction transverse to the first direction; and a fourth key capable of designating a fourth direction that is a direction opposite to the third direction. In the present embodiment, the first key is the upper key 111, and the second key is the lower key 112 (see FIG. 1). In the present embodiment, the third key is the right key 113, and the fourth key is the left key 114 (see FIG. 1).

In this case, in a state where a non-numeric character and a numeric character are displayed on the display unit 21, in a case in which the upper key 111 or the lower key 112 is operated, the control unit 45 selects an other non-numeric character and an other numeric character for changing the non-numeric character and the numeric character displayed on the display unit 21 to the other non-numeric character and the other numeric character, respectively, and causes the display unit 21 to display the other non-numeric character and the other numeric character thus selected. More specifically, for example, in a state where the hiragana character "a" and the numeric character "0" are displayed on the display unit 21 as a result of operating any key of the direction designation keys 11*a*, in a case in which the upper key 111 or the lower key 112 is further operated, the control unit 45 performs selection for changing the hiragana character "a" and the numeric character "0" to an other non-numeric character (for example, a hiragana character "i") and an other numeric character (for example, a numeric character "1"), respectively, and the control unit 45 causes the display unit 21 to display the other hiragana character "i" and the other numeric character "1" thus selected.

On the other hand, in a state where a non-numeric character and a numeric character are displayed on the display unit 21, in a case in which the right key 113 or the left key 114 is operated, the control unit 45 selects an other non-numeric character for changing the non-numeric character displayed on the display unit 21 to the other non-numeric character, causes the display unit 21 to display the other non-numeric character thus selected, and maintains the displaying of the numeric character as displayed on the display unit 21. More specifically, for example, in a state where the hiragana character "a" and the numeric character "0" are displayed on the display unit 21 as a result of operating any key of the direction designation keys 11*a*, in a case in which the right key 113 or the left key 114 is further operated, the control unit 45 performs selection for changing the hiragana character "a" to an other non-numeric character (for example, a hiragana character "ka"), and the control unit 45 causes the display unit 21 to display the other hiragana character "ka" thus selected. The control unit 45 does not change the numeric character "0" displayed on the display unit 21 to an other numeric character, and causes the display unit 21 to keep displaying the numeric character "0".

As a result, with the mobile telephone device 1, in a state where a non-numeric character and a numeric character are displayed on the display unit 21, in a case in which the upper key 111 or the lower key 112 is operated, the non-numeric character and the numeric character displayed on the display unit 21 are changed to an other non-numeric character and an other numeric character, respectively; on the other hand, in a case in which the right key 113 or the left key 114 is operated, only the non-numeric character that is input and displayed on the display unit 21 is changed to an other non-numeric character; therefore, at least one of the non-numeric character and the numeric character can be input, based on an operation of the direction designation keys 11*a*.

A non-numeric character and a numeric character may be associated with each of the direction designation keys 11*a*. More specifically, non-numeric characters and numeric characters are associated with the direction designation keys 11*a* such that, for example, a hiragana character "a" and numeric character "0" can be displayed on the display unit 21 even in a case in which any key composing the direction designation keys 11*a* is operated. Different non-numeric characters and numeric characters may be assigned to the plurality of keys composing the direction designation keys 11*a*, respectively. In this case, for example, a hiragana character "a" and a numeric character "0" may be assigned to the upper key 111, and a hiragana character "i" and a numeric character "1" may be assigned to the right key 113. For example, a hiragana character "u" and a numeric character "2" may be assigned to the lower key 112, and for example, a hiragana character "e" and a numeric character "3" may be assigned to the left key 114.

The non-numeric characters and the numeric characters associated with the direction designation keys 11*a* are not limited to the above example. Non-numeric characters and numeric characters assigned to the direction designation keys 11*a* (the upper key 111, the lower key 112, the right key 113 or the left key 114) may be non-numeric characters and numeric characters that are initially set, or may be non-numeric characters and numeric characters that are set by a user.

In a case in which any key of the direction designation keys 11*a* is operated, the control unit 45 causes the display unit 21 to display at least one of a non-numeric character and a numeric character associated with the key thus operated. For example, in a case in which the hiragana character "a" and the numeric character "0" are associated with all of the keys composing the direction designation keys 11*a*, when any key of the direction designation keys 11*a* is operated, the control unit 45 causes the display unit 21 to display at least one of the hiragana character "a" and the numeric character "0". In a case in which the hiragana character "a" and the numeric character "0" are assigned to the upper key 111, when the upper key 111 is operated, the control unit 45 causes the display unit 21 to display at least one of the hiragana character "a" and the numeric character "0".

Here, at a point in time when any key of the direction designation keys 11*a* is operated to cause the display unit 21 to display a non-numeric character and a numeric character, any one of the following screens are being displayed on the display unit 21: a standard screen (a screen that is displayed in a standby state for communication or an operation of the input key, in which other applications are not running); and a screen (editor screen) for inputting non-numeric characters and numeric characters.

As a result, with the mobile telephone device 1, in a case in which any key of the direction designation keys 11*a* is operated, the display unit 21 displays at least one of a non-numeric character and a numeric character associated with the key thus operated; therefore, at least one of the non-numeric character and the numeric character can be input, based on an operation of the direction designation keys 11*a*.

Figure 3:
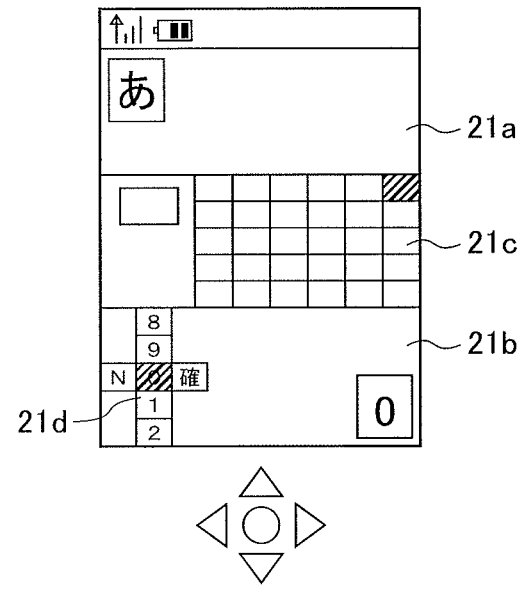
FIG. 3 is a first diagram for illustrating a non-numeric character palette and a numeric character palette.
Figure 4:
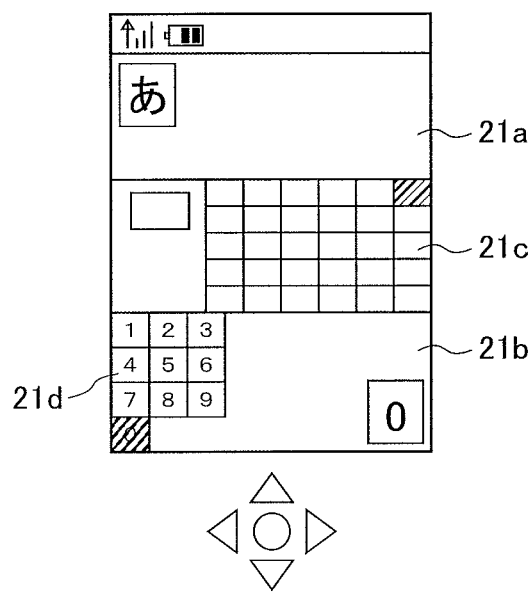
FIG. 4 is a second diagram for illustrating the non-numeric character palette and the numeric character palette.

Next, FIG. 3 is a first diagram for illustrating a non-numeric character palette 21*c* and a numeric character palette 21*d*. FIG. 4 is a second diagram for illustrating the non-numeric character palette 21*c* and the numeric character palette 21*d*.

In a state where the standard screen is displayed on the display unit 21, in a case in which any key of the direction designation keys 11*a* is operated, it is preferable for the control unit 45 to cause the display unit 21 to display a non-numeric character and a numeric character associated with the key thus operated, and the non-numeric character palette 21*c* composed of a plurality of non-numeric characters used for changing a non-numeric character to an other non-numeric character. The non-numeric character palette 21*c* may be, for example, a hiragana character palette based on the Japanese syllabary (see FIGS. 3 and 4).

In a case in which any key of the direction designation keys 11*a* is operated, the control unit 45 causes the display unit 21 to display a non-numeric character and a numeric character associated with the key thus operated, and the non-numeric character palette 21*c*. At this time, a cursor for selecting a non-numeric character is displayed in the non-numeric character palette 21*c*. In a state where a non-numeric character and a numeric character as well as the non-numeric character palette 21*c* are displayed on the display unit 21, in a case in which any key of the direction designation keys 11*a* is further operated, the control unit 45 moves the cursor toward a direction corresponding to the key thus operated. For example, in a state where the cursor is in a position of the hiragana character " あ " (pronounces as "a") in the non-numeric character palette 21*c*, in a case in which the left key 114 is operated, the control unit 45 moves the cursor to a position of a hiragana character "ka" that is immediately on the left of the hiragana character "a" in the non-numeric character palette 21*c*. Based on the movement of the cursor, the control unit 45 changes the hiragana character "a" displayed on the display unit 21 to the hiragana character "ka".

As a result, with the mobile telephone device 1, in a case in which any key of the direction designation keys 11*a* is operated, a non-numeric character and a numeric character associated with the key thus operated as well as the non-numeric character palette 21*c* are displayed, and in a case in which any key of the direction designation keys 11*a* is further operated, the cursor in the non-numeric character palette 21*c* is moved to select another non-numeric character; therefore, characters can be input, based on an operation of the direction designation keys 11*a*. With the mobile telephone device 1, since characters can be input by using the non-numeric character palette 21*c*, a character input is visualized so that characters can be easily input.

In a state where the standard screen is displayed on the display unit 21, in a case in which any key of the direction designation keys 11*a* is operated, the control unit 45 may cause the display unit 21 to display the numeric character palette 21d (see FIGS. 3 and 4) composed of a plurality of numeric characters used for changing a numeric character to an other numeric character.

In the aforementioned case, hiragana characters are displayed in the non-numeric character palette 21c. However, instead of hiragana characters, alphabetic characters may be displayed in the non-numeric character palette. In this case, in a state where the non-numeric character palette 21c is displayed on the display unit 21, in a case in which any key of the direction designation keys 11a is operated, the control unit 45 moves the cursor toward a direction corresponding to the key thus operated. For example, in a state where the cursor is in a position of an alphabetic character "f" in the non-numeric character palette 21c, in a case in which the left key 114 is operated, the control unit 45 moves the cursor to a position of an alphabetic character "e" that is immediately on the left of the alphabetic character "f" in the non-numeric character palette 21c. Based on the movement of the cursor, the control unit 45 changes the alphabetic character "f" displayed on the display unit 21 to the alphabetic character "e".

In a case in which the control unit 45 causes the display unit 21 to display a non-numeric character and a numeric character, it is preferable for the control unit 45 to cause the display unit 21 to display a non-numeric character input area 21a for inputting non-numeric characters, and a numeric character input area 21b for inputting numeric characters. In a case in which the right key 113 or the left key 114 is operated, it is preferable for the control unit 45 to maintain the displaying of the non-numeric character input area 21a for inputting non-numeric characters as well as the non-numeric character thus displayed, and to cancel the displaying of the numeric character input area 21b for inputting numeric characters as well as the numeric character thus displayed.

As exemplified in FIGS. 3 and 4, the control unit 45 causes the display unit 21 to display the non-numeric character input area 21a on an upper side of the display unit 21, and to display the numeric character input area 21b on a lower side of the display unit 21. In the present embodiment, the non-numeric character palette 21c is displayed in the non-numeric character input area 21a. As shown in the numeric character palette 21d shown in FIGS. 3 and 4, in a case in which the right key 113 or the left key 114 is operated, the control unit 45 cannot change the numeric character displayed in the numeric character input area 21b to an other numeric character, then cancels the displaying of the numeric character input area 21b, and causes the non-numeric character input area 21a to be displayed on the entire surface of the display unit 21. In a case in which the non-numeric character input area 21a is displayed on the entire surface of the display unit 21, the control unit 45 may use the numeric character input area 21b for displaying predictive conversion candidates for converting the non-numeric character, which is input and displayed in the non-numeric character input area 21a, to an other non-numeric character, word or symbol.

As a result, with the mobile telephone device 1, in a case in which a non-numeric character and a numeric character are displayed on the display unit 21, the display unit 21 displays the non-numeric character input area 21a and the numeric character input area 21b, and in addition, in a case in which the right key 113 or the left key 114 is operated, the display unit 21 maintains the displaying of the non-numeric character input area 21a, and cancels the displaying of the numeric character input area 21b; therefore, the visibility of the display unit 21 can be improved.

It is preferable for predetermined functions to be assigned to the direction designation keys 11a, respectively. In this case, in a case in which any key of the direction designation keys 11a is operated, the control unit 45 causes the display unit 21 to perform displaying based on a predetermined function assigned to the key thus operated, and to display at least one of a non-numeric character and a numeric character associated with the key thus operated. In a state where the displaying based on the predetermined function and the non-numeric character or the numeric character are displayed on the display unit 21, in a case in which any key of the direction designation keys 11a is further operated, it is preferable for the control unit 45 to select an other non-numeric character and an other numeric character for changing at least one of the non-numeric character and the numeric character displayed on the display unit 21 to the other non-numeric character and the other numeric character, respectively, and to cause the display unit 21 to display the other non-numeric character and the other numeric character thus selected; alternatively, it is preferable for the control unit 45 to select a display item based on the predetermined function, and to cause the display unit 21 to display the display item thus selected.

The predetermined function is, for example, an outgoing call history function, an incoming call history function, an address book function, a news display function, etc. In a case in which any key of the direction designation keys 11a is operated, the control unit 45 causes the display unit 21 to display at least one of the non-numeric character input area 21a and the numeric character input area 21b, as well as an area that is displayed based on the predetermined function (for example, an area for displaying outgoing call history). In a state where a plurality of areas are displayed on the display unit 21, in a case in which any key of the direction designation keys 11a is further operated, the control unit 45 changes the non-numeric character displayed in the non-numeric character input area 21a to an other non-numeric character, or changes the numeric character displayed in the numeric character input area 21b to an other numeric character. Alternatively, for example, in a state where the display unit 21 displays a plurality of outgoing call histories as a display item based on the predetermined function, in a case in which a single outgoing call history is selected by operating the direction designation keys 11a, the control unit 45 causes the display unit 21 to display the outgoing call history thus selected.

As a result, with the mobile telephone device 1, by operating the direction designation keys 11a, the display unit 21 displays a numeric character or a non-numeric character assigned to the key thus operated, and the display unit 21 also performs displaying based on a predetermined function assigned to the key thus operated; therefore, it is possible to avoid conflict of functions (non-numeric characters, numeric characters, and predetermined functions) assigned to the direction designation keys 11a.

It is preferable for a non-numeric character, a numeric character and a predetermined function to be associated with each of the direction designation keys 11a. In this case, in a state where the standard screen is displayed on the display unit 21, in a case in which any key of the direction designation keys 11a is operated, the control unit 45 causes the display unit 21 to display a non-numeric character and a numeric character associated with the key thus operated, and to perform displaying based on a predetermined function associated with the key thus operated.

In a case in which any key of the direction designation keys 11a is operated, the control unit 45 causes the display unit 21 to display the non-numeric character input area 21a into which the non-numeric character associated with the key thus operated is input, the numeric character input area 21b into which the numeric character associated with the key thus operated is input, and the area for performing the displaying based on the predetermined function associated with the key thus operated.

As a result, with the mobile telephone device 1, in a case in which any key of the direction designation keys 11*a* is operated, the control unit 45 causes the display unit 21 to display the non-numeric character input area 21*a*, the numeric character input area 21*b*, and the area for performing the displaying based on the predetermined function; therefore, functions (a non-numeric character, a numeric character, and a predetermined function) assigned to the key thus operated can be confirmed in the same screen.

Figure 5:
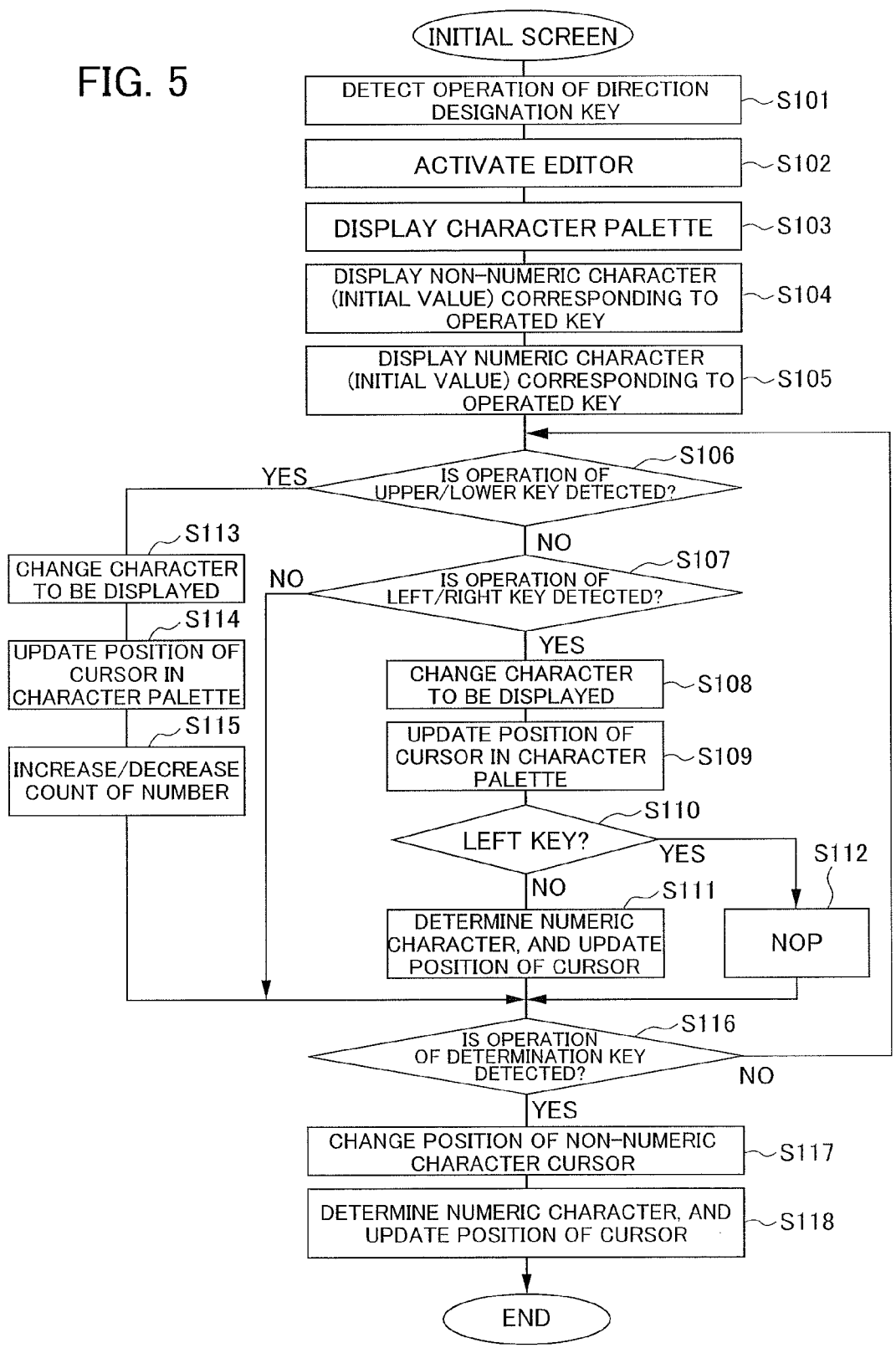
FIG. 5 is a flow chart for illustrating a first operation of the mobile telephone device.

Next, descriptions are provided for a first operation of the mobile telephone device 1 of the present embodiment. FIG. 5 is a flow chart for illustrating the first operation of the mobile telephone device 1. FIG. 6 is a diagram for illustrating screen transition in the first operation of the mobile telephone device 1.

In Step S101 shown in FIG. 5, in a state where the standard screen is displayed on the display unit 21 (see FIG. 6), in a case in which any key (the lower key 112 in a case shown in FIG. 6) of the direction designation keys 11*a* is operated, the control unit 45 detects that the direction designation key 11*a* is operated.

In Step S102, the control unit 45 activates an editor capable of inputting non-numeric characters and numeric characters.

In Step S103, the control unit 45 causes the display unit 21 to display the non-numeric character input area 21*a* and the numeric character input area 21*b*, and to display the non-numeric character palette 21*c* in the non-numeric character input area 21*a*.

In Step S104, the control unit 45 causes a non-numeric character (an initial value: a hiragana character "あ" ("a") in this case) corresponding to the key (the lower key 112 in this case) detected in Step S101 to be input and displayed in the non-numeric character input area 21*a*. In this case, the control unit 45 places the cursor in a position of the hiragana character "あ" ("a") in the non-numeric character palette 21*c*.

In Step S105, the control unit 45 causes a numeric character (an initial value: a numeric character "0" in this case) corresponding to the key (the lower key 112 in this case) detected in Step S101 to be input and displayed in the numeric character input area 21*b* (see FIG. 6C). It should be noted that the processing from Step S103 to Step S105 may be executed concurrently or separately.

In Step S106, the control unit 45 determines whether an operation of the upper key 111 or the lower key 112 is detected. More specifically, the control unit 45 determines whether the key detected in Step S101 is the upper key 111 or the lower key 112. In a case in which the operated key is not the upper key 111 or the lower key 112 (No), the processing advances to Step S107. In a case in which the operated key is the upper key 111 or the lower key 112 (Yes), the processing advances to Step S113.

In Step S107, the control unit 45 determines whether an operation of the right key 113 or the left key 114 is detected. More specifically, the control unit 45 determines whether the key detected in Step S101 is the right key 113 or the left key 114. In a case in which the operated key is the right key 113 or the left key 114 (Yes), the processing advances to Step S108. In a case in which the operated key is not the right key 113 or the left key 114 (No), the processing advances to Step S116.

In Step S108, the control unit 45 changes a displayed character. More specifically, the control unit 45 changes a non-numeric character displayed in the non-numeric character input area 21*a* to an other non-numeric character.

In Step S109, control unit 45 updates the position of the cursor on non-numeric character palette 21*c*. The control unit 45 moves the position of the cursor in the non-numeric character palette 21*c* in the direction to the left or right (in a case shown in FIG. 6, in the direction to the left) (see FIG. 6D). The processing in Steps S108 and S109 may be executed concurrently or separately.

In Step S110, the control unit 45 determines whether the key detected in Step S101 is the left key 114. In a case in which the key is not the left key 114 (No), the processing advances to Step S111. In a case in which the key is the left key 114 (Yes), the processing advances to Step S112.

In a case in which the numeric character palette 21*d* as shown in FIG. 3 is displayed in the numeric character input area 21*b*, in Step S111, the control unit 45 determines the numeric character that is input into the numeric character input area 21*b*, and moves the position of the cursor in the numeric character palette 21*d* to the right.

In a case in which the numeric character palette 21*d* as shown in FIG. 3 is displayed in the numeric character input area 21*b*, in Step S112, the control unit 45 does not execute the processing of changing the numeric character to an other numeric character, and the processing of determining the numeric character that is input into the numeric character input area 21*b* (NOP).

In Step S113, the control unit 45 updates the displayed character. More specifically, the control unit 45 changes the non-numeric character displayed in the non-numeric character input area 21*a* to an other non-numeric character. For example, in a state where the cursor is displayed in a position of a hiragana character "か" (pronounced as "ka") in the non-numeric character palette 21*c*, in a case in which the lower key 112 is operated four times, the control unit 45 changes the hiragana character "か" ("ka"), which is input into the non-numeric character input area 21*a*, to a hiragana character "こ" (pronounced as "ko").

In Step S114, the control unit 45 moves the position of the cursor in the non-numeric character palette 21*c* in the upper or lower direction (here, the lower direction) (see FIG. 6E).

In Step S115, the control unit 45 increases a count of a number in a case in which an operation of the upper key 111 was detected in Step S106, and the control unit 45 decreases the count of the number in a case in which an operation of the lower key 112 was detected in Step S106. The processing from Step S113 to Step S115 may be executed concurrently or separately.

In Step S116, the control unit 45 detects whether a determination key 115 composing the direction designation keys 11*a* is operated. The determination key 115 is, for example, a key (a center key) for executing determination processing of a non-numeric character or a numeric character. In a case in which the determination key 115 is not operated (No), the processing returns to Step S106. In a case in which the determination key 115 is operated (Yes), the processing advances to Step S117.

In Step S117, the control unit 45 changes the position of a non-numeric character cursor. More specifically, the control unit 45 moves the position of the non-numeric character cursor for inputting a non-numeric character into the non-numeric character input area 21*a* to the right.

In Step S118, the control unit 45 determines the numeric character that is input into the numeric character input area 21*b*, and updates the position of a numeric character cursor for inputting a numeric character into the numeric character input area 21*b*. More specifically, the control unit 45 moves the numeric character, which was input and established in the numeric character input area 21*b*, to the left by one character such that a new numeric character can be input (see FIG. 6F). The processing in Steps S117 and S118 may be executed concurrently or separately.

Figure 7:
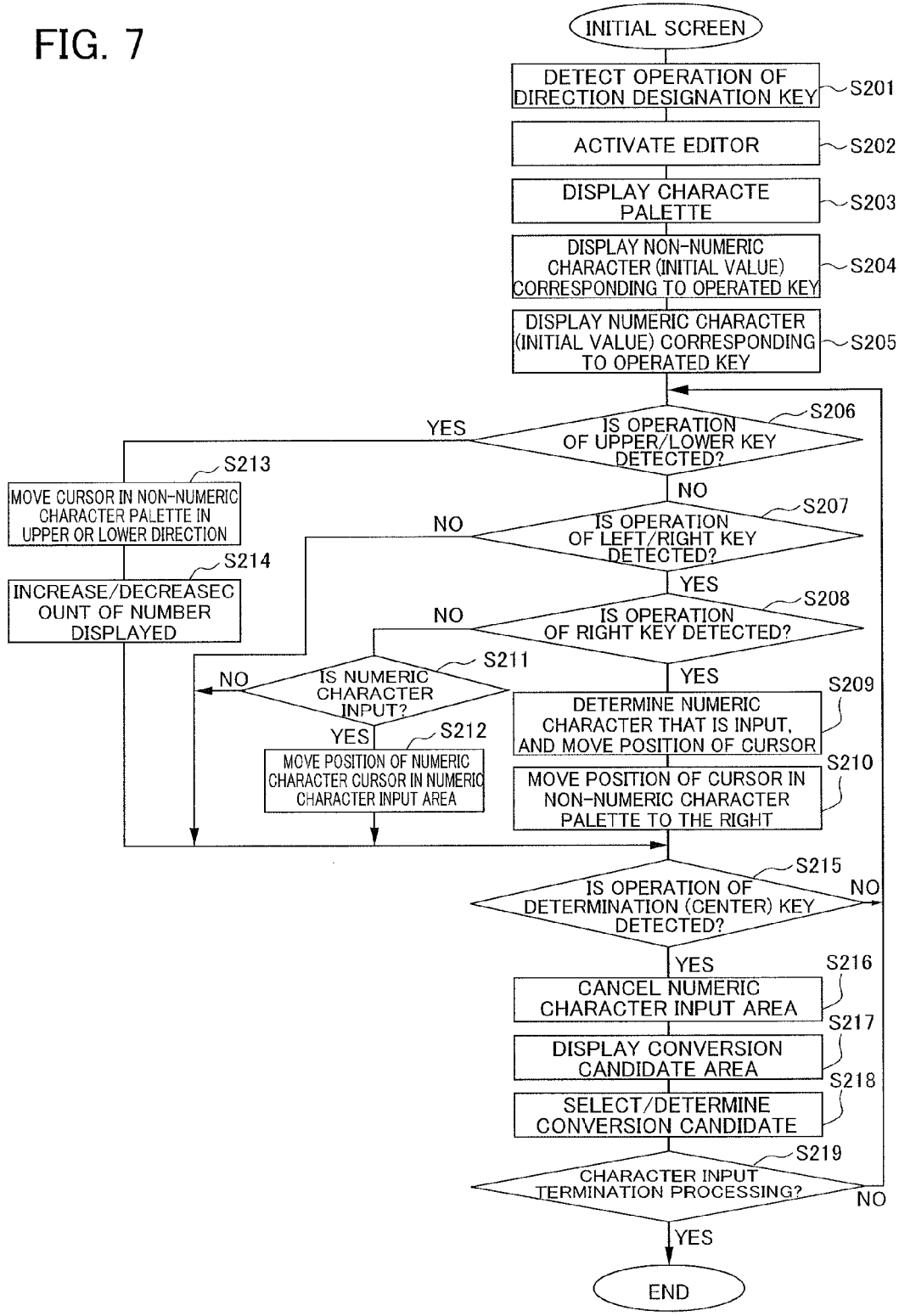
FIG. 7 is a flow chart for illustrating a second operation of the mobile telephone device.

Next, descriptions are provided for a second operation of the mobile telephone device 1 of the present embodiment. FIG. 7 is a flow chart for illustrating the second operation of the mobile telephone device 1.

In Step S201, in a state where the standard screen is displayed on the display unit 21, in a case in which any key of the direction designation keys 11a is operated, the control unit 45 detects that the direction designation key 11a is operated.

In Step S202, the control unit 45 activates the editor capable of inputting non-numeric characters and numeric characters.

In Step S203, the control unit 45 causes the display unit 21 to display the non-numeric character input area 21a and the numeric character input area 21b, and to display the non-numeric character palette 21c in the non-numeric character input area 21a.

In Step S204, the control unit 45 causes a non-numeric character corresponding to the key thus operated (the key detected in Step S201) to be input and displayed in the non-numeric character input area 21a. In this case, the control unit 45 places the cursor, for example, in a position of the hiragana character "a" in the non-numeric character palette 21c.

In Step S205, a numeric character corresponding to the key thus operated (the key detected in Step S201) is input and displayed in the numeric character input area 21b. The processing from Step S203 to Step S205 may be executed concurrently or separately.

In Step S206, the control unit 45 determines whether an operation of the upper key 111 or the lower key 112 is detected. More specifically, the control unit 45 determines whether the key detected in Step S201 is the upper key 111 or the lower key 112. In a case in which the operated key is not the upper key 111 or the lower key 112 (No), the processing advances to Step S207. In a case in which the operated key is the upper key 111 or the lower key 112 (Yes), the processing advances to Step S213.

In Step S207, the control unit 45 determines whether an operation of the right key 113 or the left key 114 is detected. More specifically, the control unit 45 determines whether the key detected in Step S201 is the right key 113 or the left key 114. In a case in which the operated key is the right key 113 or the left key 114 (Yes), the processing advances to Step S208. In a case in which the operated key is not the right key 113 or the left key 114 (No), the processing advances to Step S215.

In Step S208, the control unit 45 determines whether the key detected in Step S201 is the right key 113. In a case in which the operated key is the right key 113 (Yes), the processing advances to Step S209. In a case in which the operated key is not the right key 113 (No), the processing advances to Step S211.

In Step S209, the control unit 45 determines the numeric character that is input into the numeric character input area 21b, and moves the position of the numeric character cursor for inputting a numeric character into the numeric character input area 21b.

In Step S210, the control unit 45 moves the position of the cursor in the non-numeric character palette 21c to the right. The processing in Steps S209 and S210 may be executed concurrently or separately.

In Step S211, the control unit 45 determines whether a numeric character is input into the numeric character input area 21b. In a case in which the numeric character is input into the numeric character input area 21b (Yes), the processing advances to Step S212. In a case in which the numeric character is not input into the numeric character input area 21b (No), the processing advances to Step S215.

The control unit 45 executes processing of moving the position of the numeric character cursor for inputting a numeric character into the numeric character input area 21b. More specifically, the control unit 45 moves the numeric character, which was input and established in the numeric character input area 21b, to the left by one character such that a new numeric character can be input (see FIG. 6F).

In Step S213, the control unit 45 moves the position of the cursor displayed in the non-numeric character palette 21c in the upper or lower direction.

In Step S214, the control unit 45 increases a count of a number in a case in which an operation of the upper key 111 was detected in Step S206, and the control unit 45 decreases the count of the number in a case in which an operation of the lower key 112 was detected in Step S206. The processing in Steps S213 and S214 may be executed concurrently or separately.

In Step S215, the control unit 45 detects whether the determination key 115 composing the direction designation keys 11a is operated. The determination key 115 is, for example, a key (a center key) for executing determination processing of a non-numeric character or a numeric character. In a case in which the determination key 115 is not operated (No), the processing returns to Step S206. In a case in which the determination key 115 is operated (Yes), the processing advances to Step S216.

In Step S216, the control unit 45 executes processing of cancelling the numeric character input area 21b displayed on the display unit 21. In other words, the control unit 45 causes the display unit 21 to display the non-numeric character input area 21a on the entire surface of the display unit 21.

In Step S217, the control unit 45 causes the display unit 21 to display a conversion candidate area for converting a non-numeric character displayed in the non-numeric character input area 21a into an other non-numeric character. For example, in a case in which a hiragana character string "Yokohama" is displayed in the non-numeric character input area 21a, the control unit 45 causes the display unit 21 to display the conversion candidate area, into which non-numeric characters serving as conversion candidates such as kanji character strings "Yokohama", "Yokohama City" and "Yokohama Station" are input. The processing in Steps S216 and S217 may be executed concurrently or separately.

In Step S218, the control unit 45 detects that any conversion candidate is selected and determined from a plurality of conversion candidates displayed in the conversion candidate area. In the above example, in a case in which the kanji character string "Yokohama", which is input into the conversion candidate area, is selected and established, the control unit 45 converts the hiragana character string "Yokohama" displayed in the non-numeric character input area 21a into the kanji character string "Yokohama".

In Step S219, the control unit 45 determines whether the processing of terminating a character input is executed. In other words, the control unit 45 determines whether the processing of terminating a character input is selected through an operation by the user. In a case in which the processing of terminating a character input is not selected (No), the processing returns to Step S206. In a case in which the processing of terminating a character input is selected (Yes), the processing is terminated.

Figure 8:
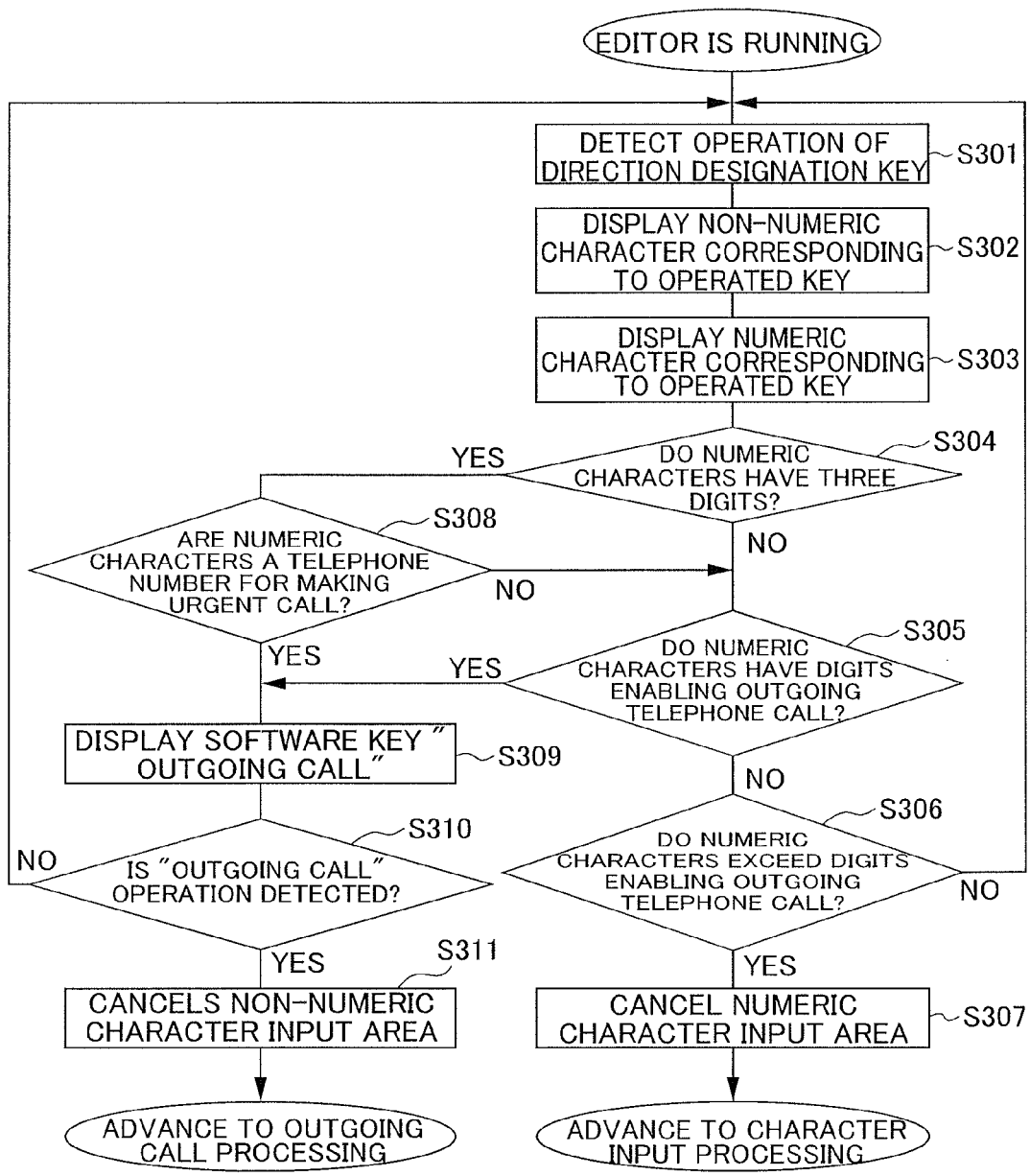
FIG. 8 is a flow chart for illustrating a third operation of the mobile telephone device.

Next, descriptions are provided for a third operation of the mobile telephone device 1 of the present embodiment. FIG. 8 is a flow chart for illustrating the third operation of the mobile telephone device 1.

In Step S201, in a state where the editor for inputting non-numeric characters and numeric characters is running, in a case in which any key of the direction designation keys 11a is operated, the control unit 45 detects that the direction designation key 11a is operated.

In Step S302, the control unit 45 causes a non-numeric character corresponding to the key thus operated (the key detected in Step S301) to be input and displayed in the non-numeric character input area 21a.

In Step S303, the control unit 45 causes a numeric character corresponding to the key thus operated (the key detected in Step S301) to be input and displayed in the numeric character input area 21b. The processing in Steps S302 and S303 may be executed concurrently or separately.

In Step S304, the control unit 45 determines whether the numeric characters input into the numeric character input area 21b have three digits. In a case in which the numeric characters do not have three digits (No), the processing advances to Step S305. In a case in which the numeric characters have three digits (Yes), the processing advances to Step S308.

In Step S305, the control unit 45 determines whether the numeric characters input into the numeric character input area 21b have the number of digits that enables an outgoing telephone call (for example, 10 digits, 11 digits with the initial numeric character 0, or 14 digits with a prefix number). In a case in which the numeric characters do not have the number of digits that enables an outgoing telephone call (No), the processing advances to Step S306. In a case in which the numeric characters have the number of digits that enables an outgoing telephone call (Yes), the processing advances to Step S309.

In Step S306, the control unit 45 determines whether the number of digits of the numeric characters input into the numeric character input area 21b exceeds the number of digits (14 digits) that enables an outgoing telephone call. In a case in which the number of digits exceeds the number of digits that enables an outgoing telephone call (No), the processing returns to Step S301. In a case in which the number of digits does not exceed the number of digits that enables an outgoing telephone call (Yes), the processing advances to Step S307.

In Step S307, the control unit 45 cancels the numeric character input area 21b from the display unit 21. In other words, the control unit 45 causes the display unit 21 to display only the non-numeric character input area 21a. After the processing in Step S307, the processing advances to character input processing.

In Step S304, the control unit 45 determines whether the numeric characters input into the numeric character input area 21b are a telephone number for making an urgent call such as "110", "118" or "119". In a case in which the numeric characters are not a telephone number for making an urgent call (No), the processing advances to Step S305. In a case in which the numeric characters are a telephone number for making an urgent call (Yes), the processing advances to Step S309.

In Step S309, the control unit 45 causes the display unit 21 to display a software key, to which an "outgoing call" function is assigned. Here, a key image of the software key displayed on the display unit 21 corresponds to any of the keys composing the operation unit. The function assigned to the key is executed by operating the key corresponding to the key image.

In Step S310, in a case in which the "outgoing call" software key displayed in Step S309 is operated, the control unit 45 detects an "outgoing call" operation.

In Step S311, the control unit 45 cancels the non-numeric character input area 21a displayed on the display unit 21. In other words, the control unit 45 causes the display unit 21 to display the non-numeric character input area 21a on the entire surface of the display unit 21. After the processing in Step S311, the processing advances to outgoing call processing.

Next, descriptions are provided for a fourth operation of the mobile telephone device 1 of the present embodiment. The fourth operation is an operation for the display unit 21 to display the non-numeric character input area 21a and to perform displaying regarding a predetermined function in a case in which any key of the direction designation keys 11a is operated; and the fourth operation is similar to the aforementioned first operation (the operation for the display unit 21 to display the non-numeric character input area 21a and the numeric character input area 21b in a case in which any key of the direction designation keys 11a is operated). Accordingly, descriptions are provided for the fourth operation of the mobile telephone device 1 with reference to only the drawings (FIGS. 8 and 10) illustrating screen transition.

First of all, descriptions are provided for a first example of the fourth operation. FIG. 9 is a first diagram for illustrating screen transition in the fourth operation of the mobile telephone device 1.

In a state where the standard screen is displayed (see FIG. 9A), in a case in which any key (here, the right key 113) of the direction designation keys is operated, the control unit 45 causes the display unit 21 to display the non-numeric character input area 21a including the non-numeric character palette 21c, and to perform displaying regarding a predetermined function (here, the outgoing call history function) (see FIG. 9B).

Next, in a case in which the lower key 112 is operated for a plurality of times (here, four times), the control unit 45 moves the cursor in the non-numeric character palette 21c in the lower direction, and changes a hiragana character " " (pronounced as "wa") displayed in the non-numeric character input area 21a to an other hiragana character " " (pronounced as "wo"). The control unit 45 changes the outgoing call history (scrolling in the lower direction; see FIG. 9C).

Next, in a case in which the lower key 112 is operated for a plurality of times (here, four times), the control unit 45 moves the cursor to the top line in the same column of the non-numeric character palette 21c, and thereafter moves the cursor in the lower direction again. The control unit 45 changes the hiragana character " " ("wo") displayed in the non-numeric character input area 21a to an other hiragana character " " (pronounced as "e"). The control unit 45 changes the outgoing call history (scrolling in the lower direction). Here, since the cursor continuously moves in the same column of the non-numeric character palette 21c, and a determination operation is not performed (more specifically, in a case in which the same key of the direction designation keys 11a is consecutively operated for more than a predetermined number of times), the control unit 45 determines that an operation for inputting a non-numeric character into the non-numeric character input area 21a is not being performed, and causes the display unit 21 to display a notification pictogram 21e (see FIG. 9D). It should be noted that a shape of the notification pictogram 21e is not limited to the shape shown in the FIG. 9D.

Next, in a state where the notification pictogram 21e is displayed, in a case in which the lower key 112 is further operated (in a case of performing an operation that is less likely to input a character), the control unit 45 cancels the non-numeric character input area 21a from the display unit 21, and displays an outgoing call history on the entire surface of the display unit 21 (see FIG. 9E).

Descriptions are provided for a second example of the fourth operation. FIG. 10 is a second diagram for illustrating screen transition in the fourth operation of the mobile telephone device 1. In a state where the standard screen is displayed (see FIG. 10A), in a case in which any key (here, the right key 113) of the direction designation keys 11a is operated, the control unit 45 causes the display unit 21 to display the non-numeric character input area 21a including the non-numeric character palette 21c, and to perform displaying regarding a predetermined function (here, the outgoing call history function) (see FIG. 10B).

Next, in a case in which the lower key 112 is operated, the control unit 45 changes the hiragana character " わ " ("wa") input into the non-numeric character input area 21a to the other hiragana character " い " (pronounces as "i"), and moves the cursor in the non-numeric character palette 21c in the lower direction. The control unit 45 changes the outgoing call history (scrolling in the lower direction; see FIG. 10C).

Next, in a case in which a calling key (not shown) is operated, the control unit 45 causes the display unit 21 to display the outgoing call history, which is displayed in a state shown in FIG. 10C, on the entire surface of the display unit 21 (see FIG. 10D).

In a state shown in FIG. 10B, in a case in which the right key 113 is operated, the control unit 45 moves the cursor in the non-numeric character palette 21c to the right, and changes the hiragana character " わ " ("wa") displayed in the non-numeric character input area 21a to an other hiragana character " ら " (pronounced as "ra"). Here, since the outgoing call history displayed on the display unit 21 is changed by only the upper key 111 or the lower key 112, the control unit 45 determines that the operation of the right key 113 is not an operation for changing the outgoing call history, and causes the display unit 21 to display the notification pictogram 21e (see FIG. 10E). A shape of the notification pictogram 21e is not limited to the shape shown in the FIG. 10E.

Next, in a state where the notification pictogram 21e is displayed, in a case in which the right key 113 is further operated (in a case in which the outgoing call history is not changed), the control unit 45 cancels the outgoing call history from the display unit 21, and displays the non-numeric character input area 21a on the entire surface of the display unit 21 (see FIG. 9E).

Figure 11:
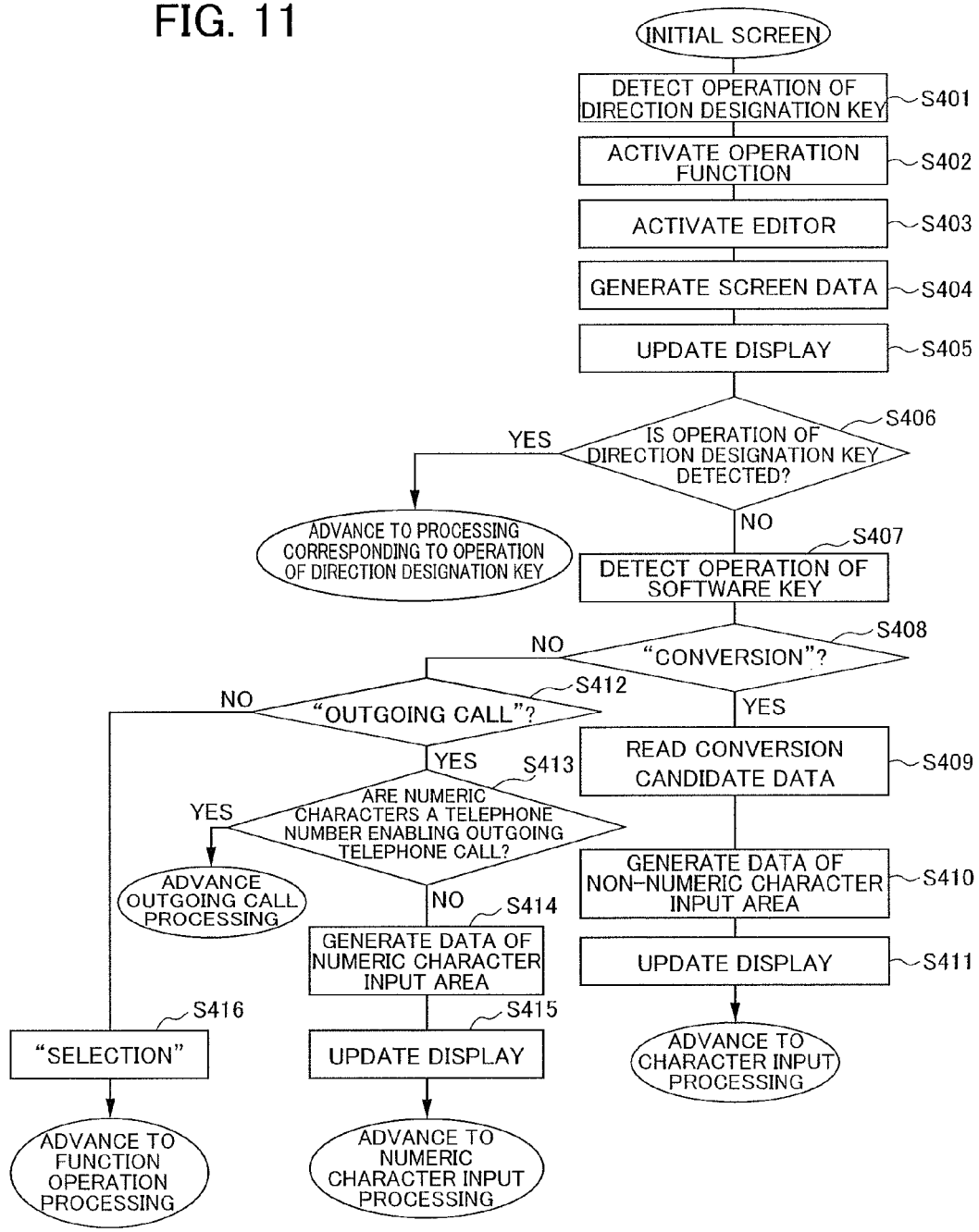
FIG. 11 is a flow chart for illustrating a fifth operation of the mobile telephone device.

Next, descriptions are provided for a fifth operation of the mobile telephone device 1 of the present embodiment. FIG. 11 is a flow chart for illustrating the fifth operation of the mobile telephone device 1. FIG. 12 is a diagram for illustrating screen transition in the fifth operation of the mobile telephone device 1.

In Step S401, in a state where the standard screen is displayed (see FIG. 12A), in a case in which any key (here, the right key 113) of the direction designation keys 11a is operated, the control unit 45 detects that the direction designation key 11a is operated.

In Step S402, the control unit 45 executes processing of activating a function (here, the outgoing call history function) corresponding to right key 113 thus operated.

In Step S403, the control unit 45 activates the editor for inputting non-numeric characters and numeric characters. The processing in Steps S402 and S403 may be executed concurrently or separately.

In Step S404, the control unit 45 executes processing of generating image data for causing the display unit 21 to display an outgoing call history as well as a hiragana character " わ " ("wa") and a numeric character "0" assigned to the right key 113 thus operated.

Figure 12A:
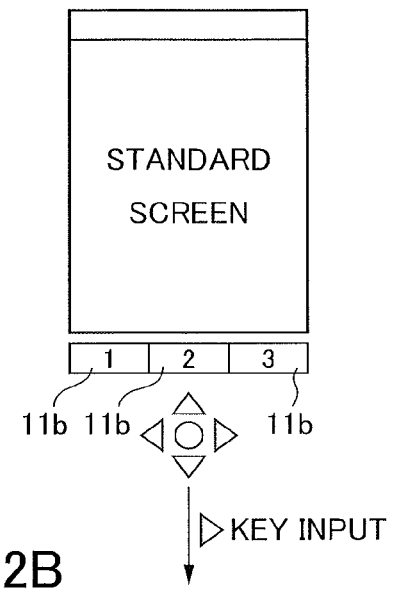
FIG. 12 is a diagram for illustrating screen transition in the fifth operation of the mobile telephone device.
Figure 12B:
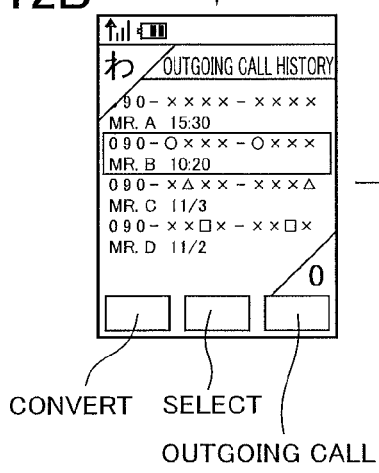
Figure 12C:
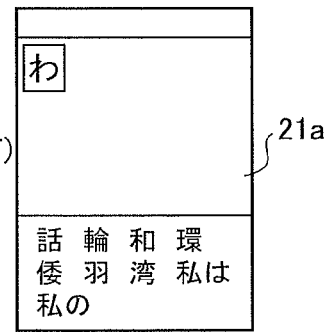

In Step S405, the control unit 45 executes display updating processing of causing the display unit 21 to perform displaying based on the image data generated in Step S404 (see FIG. 12B). Furthermore, the control unit 45 executes processing of causing the display unit 21 to display software keys of "conversion", "selection" and "outgoing call".

In Step S406, the control unit 45 determines whether a further operation of the direction designation keys 11a is detected. In a case in which an operation of the direction designation keys 11a is detected (Yes), processing corresponding to the operation of the direction designation keys 11a is executed. In a case in which an operation of the direction designation keys 11a is not detected (No), the processing advances to Step 407.

In Step S407, the control unit 45 detects whether a software key is operated.

In Step S408, the control unit 45 determines whether the software key, of which operation was detected in Step S407, is "conversion". In a case in which an operation of "conversion" is detected (Yes), the processing advances to Step S409. In a case in which an operation of "conversion" is not detected (No), the processing advances to Step S412.

In Step S409, the control unit 45 reads, from storage unit, conversion candidate data for converting the hiragana character " わ " ("wa") displayed on the display unit 21 into an other non-numeric character or the like.

In Step S410, the control unit 45 generates display data of the non-numeric character input area 21a displayed on the display unit 21.

In Step S411, the control unit 45 executes processing of updating the displaying of the display unit 21, based on the conversion candidate data that was read in Step S409, and the display data of the non-numeric character input area 21a that was generated in Step S410.

In Step S412, the control unit 45 determines whether the software key, of which operation was detected in Step S407, is "outgoing call".

In Step S413, the control unit 45 determines whether the numeric characters displayed on the display unit 21 in Step S405 can be used as a telephone number for making an outgoing call. In a case in which the numeric characters can be used as a telephone number for making an outgoing call (Yes), the processing advances to call originating processing. In a case in which the numeric characters cannot be used as a telephone number for making an outgoing call (No), the processing advances to Step 414.

In Step S414, the control unit 45 generates display data of the numeric character input area 21b displayed on the display unit 21.

Figure 12D:
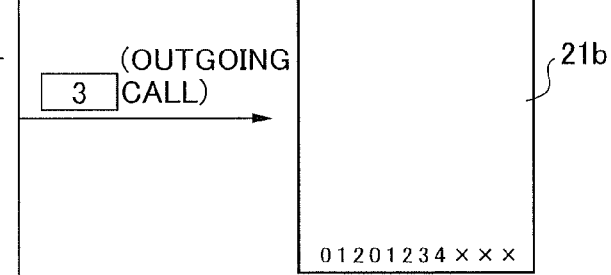
Figure 12E:
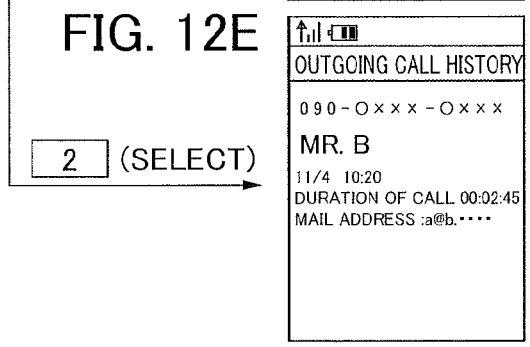

In Step S415, the control unit 45 executes processing of updating the displaying of the display unit 21, based on the display data generated in Step S414 (see FIG. 12D).

After the processing in Step S415, the processing advances to numeric character input processing.

In Step S416, the control unit 45 determines that the software key, of which operation was detected in Step S407, is "selection".

After the processing in Step S416, the processing advances to processing of operating a predetermined function.

The present invention is not limited to the aforementioned embodiment, and can be implemented as various embodiments.

Although the aforementioned embodiment has been described for a case in which the mobile telephone device 1 is configured with a single direction designation key 11a (composed of the upper key 111, the right key 113, the lower key 112 and the left key 114), the present invention is not limited to this configuration. Therefore, the direction designation keys may be composed of a plurality of keys. In other words, the upper key, the right key, the lower key and the left key may be mutually independent keys.

Moreover, although the aforementioned embodiment has been described for a case in which the direction designation keys 11a are composed of hardware keys, the present invention is not limited to this configuration. In other words, in a case of a touch panel including a touch sensor, the direction designation keys may be displayed as software keys on the touch panel.

Second Embodiment

Figure 13:
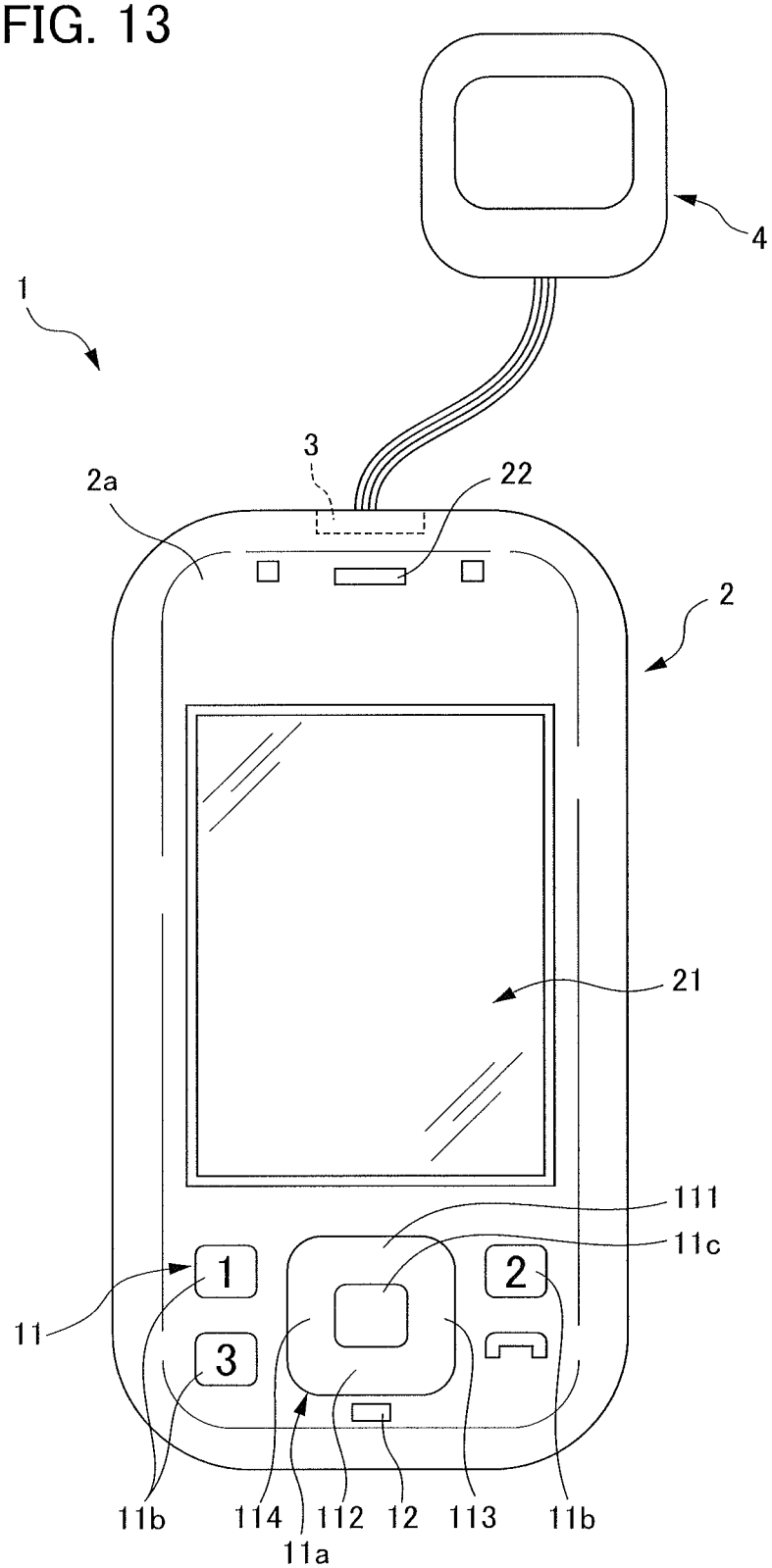
FIG. 13 is a perspective view showing an appearance of a mobile telephone device according to a second embodiment of the electronic device of the present invention.

First of all, with reference to FIG. 13, descriptions are provided for a basic structure of a mobile telephone device according to a second embodiment of the electronic device of the present invention. FIG. 13 is a perspective view showing an appearance of a mobile telephone device 1 according to the second embodiment of the electronic device.

The mobile telephone device 1 is a mobile telephone device of a straight type. An external shape of the mobile telephone device 1 is mainly configured with: a case 2; a removable member 3 that is removably attached to the case 2; and a strap 4 that is connected to the removable member 3. The mobile telephone device 1 has a security alarm function in addition to a telephone call function. The security alarm function is a function to draw attention of people around a user by operating the mobile telephone device 1 to generate sound at full blast, in a case in which the user sensed danger.

An operation unit 11, a display unit 21, a microphone 12 and a speaker 22 are disposed on a front face 2a of the case 2.

The operation unit 11 includes a plurality of direction designation keys 11a (direction designating means) for designating distinct directions, a function activation key 11b for activating a predetermined function and the like, and a determination key 11c (determining means) for performing a determination operation and the like. Here, even in a case in which the plurality of direction designation keys 11a are physically composed of a single key as shown in FIG. 13, such a key is assumed to be a plurality of direction designation keys as long as different functions are assigned to upper, right, lower and left directions, respectively. More specifically, such means may be capable of designating a plurality of directions, and may be a joystick, a track ball, or other pointing devices. Detection through a capacitive sensor or an infrared sensor may be employed to enable designation of a plurality of directions.

In the present invention, the direction designation keys 11a of the operation unit 11 perform not only a direction designation operation and a scroll operation in upper, lower, left and right directions, but also an input operation of symbols including numeric characters, non-numeric characters, alphabetic characters and the like. Here, the present invention assumes that a numeric character includes not only a single numeric character but also a numeric character string, a character includes not only a single character but also a character string, an alphabetic character includes not only a single alphabetic character but also an alphabetic character string, and a symbol includes not only a single symbol but also a symbol string. The direction designation keys 11a include an upper key 111 capable of designating the upper direction, a lower key 112 capable of designating the lower direction, a right key 113 capable of designating the right direction, and a left key 114 capable of designating the left direction.

Characters include non-numeric characters other than numeric characters, such as, for example, hiragana characters, katakana characters, alphabetic characters, symbols and the like.

For example, in a standby state for communication, in which a predetermined application is not running, i.e. in a state where a standard screen (also referred to as an idle screen) is displayed on the display unit 21, when any key of the direction designation keys 11a is operated, a character associated with the key thus operated is input. The character thus input is displayed on the display unit 21. The character thus input is used for inputting a character for a character input application or the like by a predetermined operation. In a state where a screen based on a predetermined application, for example, a character input screen based on a mail application, is displayed on the display unit 21, when any key of the direction designation keys 11a is operated, a character associated with the key thus operated is input. The character thus input is displayed on the display unit 21.

Based on an operation of the function activation key 11b of the operation unit 11, the control unit 45 to be described below executes each application such as a telephone directory application, a mail application, and a Web application.

A predetermined function is assigned to each key, in accordance with a type of an application that is running. In a case in which a user operates a key, i.e. depresses a key, the control unit 45 to be described below executes an operation in accordance with a function assigned to the key thus operated.

Based on an operation of the determination key 11c of the operation unit 11, the control unit 45 to be described below performs determination and the like of various operations. For example, when a character is input, the determination key 11c performs a determination operation such as determining a character selected by the direction designation keys 11a. Here, in the present invention, when the determination key 11c is depressed, a character palette and any of a conversion candidate or a prediction candidate are selected.

The display unit 21 is composed of a liquid crystal display, an organic EL (electroluminescence) display or the like. In a standby state for communication, in which a predetermined application is not running, the standard screen (also referred to as the idle screen) is displayed on the display unit 21. In a case in which a predetermined application is running, a screen based on an operation of the application is displayed. For example, in the standby state for communication, the preset standard screen is displayed on the display unit 21. In a state where a character is input in the mail application, a character input screen is displayed.

The display unit 21 displays a first area 100 for displaying a plurality of characters that can be selected as characters to be input. Here, a so-called character palette is displayed in the first area 100. An example of the character palette may include, for example, hiragana characters arranged in the order of the Japanese syllabary based on vowels and consonants (see the first area 100 in FIG. 15). The display unit 21 displays a second area 200 for displaying conversion candidates or prediction candidates for an input character (see the second area 200 in FIG. 15; a plurality of prediction candidates are displayed in FIG. 15). The display unit 21 displays a third area 300 adjacently to the first area 100 and the second area 200 (see the third area 300 in FIG. 15). The display unit 21 displays a character input area 400 for displaying an input character.

The microphone 12 inputs sound produced by the user of the mobile telephone device 1 during a telephone call. The speaker 22 outputs sound of the other party of a telephone call when using the mobile telephone device 1.

The mobile telephone device is not limited to the mobile telephone device 1 of the straight type described above. In other words, the mobile telephone device may be of: a slider type in which one case slides to one direction from a state in which the operation unit side case and the display unit side case are mutually superimposed; a rotating type in which one case is rotated around an axis line along the superimposing direction; a type in which the display unit side case and the operation unit side case are connected via a 2-axis hinge; or a flip type in which the display unit side case and the operation unit side case are connected via a hinge mechanism.

Figure 14:
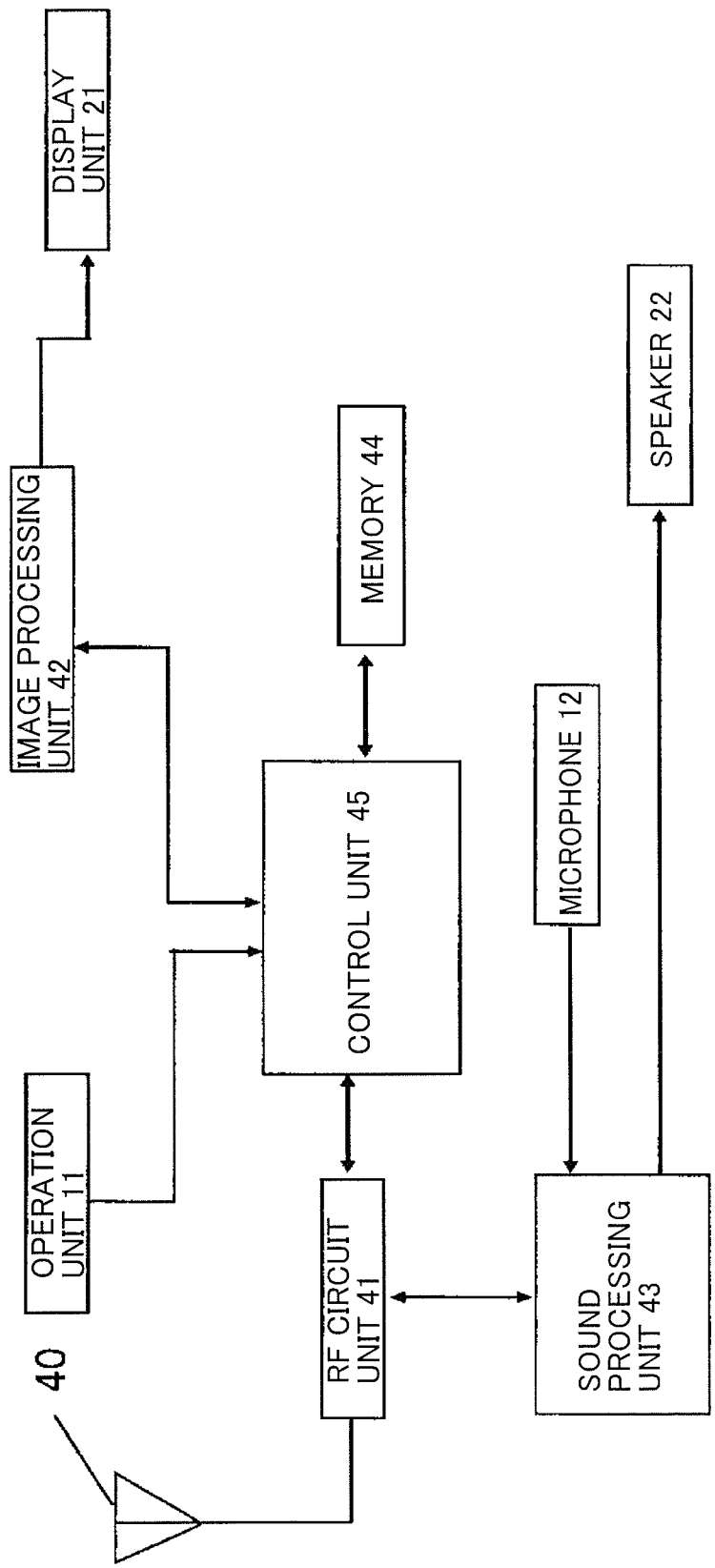
FIG. 14 is a functional block diagram showing a schematic configuration of functions of the mobile telephone device according to the second embodiment.

Next, descriptions are provided for a functional configuration of the mobile telephone device 1. FIG. 14 is a functional block diagram showing functions of the mobile telephone device 1 according to the second embodiment. The mobile telephone device 1 includes the operation unit 11 (including the direction designation keys 11a, the function activation key 11b, and the determination key 11c), the microphone 12, the display unit 21, and the speaker 22. The mobile telephone device 1 internally includes: a main antenna 40, an RF circuit unit 41, an image processing unit 42, a sound processing unit 43, memory 44, and the control unit 45. The configurations of the operation unit 11, the microphone 12, the display unit 21 and the speaker 22 are as described above.

The main antenna 40 communicates with external devices such as base stations via a predetermined usable frequency band (for example, 800 MHz band). Although 800 MHz is set as the predetermined usable frequency band in the present embodiment, other frequency bands can also be used.

The RF circuit unit 41 executes demodulation processing on a signal received via the main antenna 40, and transmits the processed signal to the control unit 45. The RF circuit unit 41 executes modulation processing on a signal transmitted from the control unit 45, and transmits the signal to external devices via the main antenna 40. On the other hand, the RF circuit unit 41 notifies the control unit 45 of the intensity of a signal received via the main antenna 40.

The image processing unit 42 executes predetermined image processing, and outputs the processed image data to a driver IC, in accordance with control by the control unit 45. When the image data is transmitted from the image processing unit 42, the driver IC stores the image data in frame memory, and outputs the image data to the display unit 21 at predetermined timing.

The sound processing unit 43 executes predetermined sound processing on a signal transmitted from the RF circuit unit 41, and outputs the processed signal to the speaker 22, in accordance with control by the control unit 45. The speaker 22 externally outputs the signal that is transmitted from the sound processing unit 43.

When a signal is input from the microphone 12, the sound processing unit 43 processes the signal, and outputs the processed signal to the RF circuit unit 41, in accordance with control by the control unit 45. The RF circuit unit 41 executes predetermined processing on the signal transmitted from the sound processing unit 43, and outputs the processed signal to the main antenna 40.

The memory 44 includes, for example, working memory, and is utilized for arithmetic processing by the control unit 45. The memory 44 stores a plurality of applications as well as various tables and the like that are required by the applications. The memory 44 may also serve as detachable external memory.

The control unit 45 controls the entirety of the mobile telephone device 1, and is configured to employ a central processing unit (CPU) and the like. The control unit 45 performs predetermined control of the image processing unit 42, the sound processing unit 43, and the memory 44.

In a state where the standard screen or the character input screen is displayed on the display unit 21, in a case in which any key of the direction designation keys 11a (the upper key 111, the lower key 112, the right key 113 and the left key 114) is further operated, the control unit 45 causes the display unit 21 to display a character associated with the key thus operated in the character input area 400. In a state where a character is displayed in the character input area 400 of the display unit 21, in a case in which any key of the direction designation keys 11a (the upper key 111, the lower key 112, the right key 113 and the left key 114) is further operated (in a case in which any direction is designated by the direction designation key 11a), the control unit 45 performs selection for changing the displayed character to an other character, and causes the display unit 21 to display the other character thus selected in the character input area 400.

More specifically, for example, in a state where the standard screen is displayed on the display unit 21, in a case in which any key of the direction designation keys 11a (for example, the upper key 111) is operated, the control unit 45 causes the display unit 21 to display a character (for example, a hiragana character " あ " ("a")) associated with the key thus operated in the character input area 400. Characters to be input when operating the keys may be associated in advance with the direction designation keys 11a, respectively, or may be arbitrarily set by the user. In a state where the hiragana character "a" is displayed in the character input area 400 of the display unit 21, in a case in which the lower key 112 of the direction designation keys 11a is further operated, the control unit 45 assumes that selection has been made for changing the hiragana character " あ " ("a") to an other hiragana character " い " (pronounced as "i") that is displayed in a direction designated in the first area 100 (see the first area 100 in FIG. 15 regarding the layout of the characters), and the control unit 45 causes the display unit 21 to display the other hiragana character " い " ("i") thus selected in the character input area 400. In a state where the hiragana character " い " ("i") is displayed in the character input area 400 of the display unit 21, in a case in which the left key 114 of the direction designation keys 11a is further operated, the control unit 45 assumes that an operation has been made for changing the hiragana character " い " ("i") to an other hiragana character " き " (pronounced as "ki") that is displayed in a direction designated in the first area 100 (see the first area 100 in FIG. 15 regarding the layout of the characters), and the control unit 45 causes the display unit 21 to display the other hiragana character " き " ("ki") thus selected in the character input area 400. In a state where the hiragana character "ki" is displayed in the character input area 400 of the display unit 21, when the determination key 11c is operated, the control unit 45 determines the input of the hiragana character "ki". Subsequently, a character following the hiragana character "ki" can be input.

In this way, in a case in which any key of the direction designation keys 11a (the upper key 111, the lower key 112, the right key 113 and the left key 114) is operated, the mobile telephone device 1 causes the display unit 21 to display a character. In a case in which any key of the direction designation keys 11a (the upper key 111, the lower key 112, the right key 113 and the left key 114) is further operated, the mobile telephone device 1 changes the character displayed on the display unit 21 to an other character, and causes the display unit 21 to display the other character. As a result, a character can be input, based on an operation of the direction designation keys 11a.

In a case in which any key of the direction designation keys 11a (for example, the upper key 111) is operated, it is also possible to cause the character input area 400 of the display unit 21 to display an alphabetic character (for example "a") assigned to the upper key 111. In a state where the alphabetic character "a" is displayed in the character input area 400 of the display unit 21, in a case in which the lower key 112 of the direction designation keys 11a is further operated, the control unit 45 assumes that selection has been made for changing the alphabetic character "a" to an other alphabetic character "k" that is displayed in a direction designated in the first area 100 (a layout of alphabetic characters is not illustrated), and the control unit 45 causes the display unit 21 to display the other alphabetic character "k" thus selected in the character input area 400.

Incidentally, in a case in which a character is input by using the direction designation keys, the number of keys for inputting characters is limited. As a result, a problem as follows has been suffered. For example, in a case in which the user selects a character from the character palette that displays characters that can be input, and the user inputs a desired character by using conversion candidates or predictive candidates for the character, the user had to separately use the input using the character palette and the input using conversion candidates or predictive candidates by way of the direction designation keys, and such an operation has been complicated.

Accordingly, in order to solve the problem as described above, the control unit 45 according to the present embodiment performs control as follows. More specifically, in a state where the third area 300 is selected, in a case in which the determination key 11c is operated, the control unit 45 selects the second area 200 or a conversion candidate or a prediction candidate displayed in the second area 200, and in a case in which any of the direction designation key 11a is operated, the control unit 45 selects the first area 100 or a character displayed in the first area 100. Alternatively, in a state where the third area 300 is selected, in a case in which the determination key 11c is operated, the control unit 45 selects the first area 100 or a character displayed in the first area 100, and in a case in which any of the direction designation key 11a is operated, the control unit 45 selects the second area 200 or a conversion candidate or a prediction candidate displayed in the second area 200.

As a specific example, in a state where the standard screen is displayed on the display unit 21, when a hiragana character "a" is input by an operation of the upper key 111 of the direction designation keys 11a, the control unit 45 causes the display unit 21 to display the hiragana character "a" in the character input area 400. The display unit 21 displays: the first area 100 as a character palette for displaying characters that can be selected as input characters; the second area 200 for displaying predictive candidates for the hiragana character "a"; and the third area 300 that is adjacent to the first area 100 and the second area 200. In a state where the third area 300 is selected, in a case in which the determination key 11c is operated, the control unit 45 selects the second area 200 or a prediction candidate displayed in the second area 200. Alternatively, in a state where the third area 300 is selected, in a case in which any of the direction designation keys 11a is operated, the control unit 45 selects the first area 100 or a character displayed in the first area 100.

In this manner, in a state where the third area 300 adjacent to the first area 100 and the second area 200 is selected, the mobile telephone device 1 can determine whether the first area 100 or the second area 200 is selected, based on whether the determination key 11c is operated or any of the direction designation keys 11a is operated without operating the determination key 11c. Thus, the first area 100 and the second area 200 can be separately used in an effective manner. Therefore, the user can easily input a desired character without complicated operations.

First of all, descriptions are provided for a sixth operation of the mobile telephone device 1 with reference to FIG. 16. First of all, the sixth operation postulates that the standard screen is displayed on the display unit 21 (see FIG. 16A). In a state where the standard screen is displayed on the display unit 21, in a case in which any key of the direction designation keys 11a (for example, the upper key 111) is operated, the control unit 45 causes the display unit 21 to display a character (here, a hiragana character " あ " ("a")) associated with the key thus operated (see FIG. 16B) in the character input area 400. In addition, the display unit 21 displays: the first area 100 for displaying a plurality of characters that can be selected as input characters; the second area 200 for displaying a plurality of conversion candidates for the hiragana character " あ " ("a"); and the third area 300 that is adjacent to the first area 100 and the second area 200 (see FIG. 16B).

As shown in FIG. 16B, in a state where the hiragana character " あ " ("a") is displayed in the upper right corner of the first area 100, and is selected by a cursor 60 (see the first area 100 in FIG. 15 regarding the layout of characters), when the upper direction is designated by the upper key 111, since there is no character in the upper direction from the hiragana character " あ " ("a") in the first area 100, the control unit 45 selects the third area 300 by the cursor 50 (see FIG. 16C).

In a state where the third area 300 is selected by the cursor 50, in a case in which the determination key 11c is operated, and the upper direction is designated by the upper key 111, the control unit 45 controls that a kanji character " 亜 " (pronounced as "a") displayed in the upper left corner is selected by the cursor 50 from a plurality of conversion candidates in the second area 200 that is displayed above the third area 300, and the kanji character " 亜 " ("a") is displayed in the character input area 400 of the display unit (see FIG. 16D).

In a state where the third area 300 is selected by the cursor 50, in a case in which the determination key 11c is not operated, and the upper direction is designated by the upper key 111, the control unit 45 controls that a hiragana character " お " (pronounced as "o") displayed in the lower right corner is selected by the cursor 50 from a plurality of hiragana characters in the first area 100 that is displayed below the third area 300, and the hiragana character " お " ("o") is displayed in the character input area 400 of the display unit 21 (see FIG. 16E). A so-called toggle operation is performed.

In this manner, in a case in which a desired character is input by using the direction designation keys 11a, in a state where the third area 300 is selected, the mobile telephone device 1 determines whether the first area 100 or the second area 200 is selected, based on whether the determination key 11c is operated or any of the direction designation keys 11a is operated without operating the determination key 11c. Thus, the first area and the second area can be separately used. Therefore, the user can easily input a desired character.

Here, in the sixth operation, in a state where the standard screen is displayed on the display unit 21, in a case in which any key of the direction designation keys 11a (for example, the upper key 111) is operated, the character input area 400 of the display unit 21 displays a character associated with the key thus operated. However, the sixth operation is not limited thereto, and a character may be input into the character input area 400 of the display unit 21 by an operation of any of the direction designation keys 11a, in a state where a character input screen in the mail application or the like is displayed on the display unit 21. The direction designating keys 11a are not limited to the upper key 111, and may be the lower key 112, the right key 113, and the left key 114.

In the sixth operation, a character is input as selected by the cursor 50. However, the sixth operation is not limited thereto, and a character may be input only when a key such as the determination key is operated after selecting the character by the cursor 50. It is preferable for the determination key to be a center key, which is the so-called determination key 11c surrounded by the direction designation keys 11a, but it is not limited thereto.

In the sixth operation, in a state where the third area 300 is selected, in a case in which the determination key 11c is operated, and the upper direction is designated by the upper key 111, the kanji character " 亜 " ("a") displayed in the upper left corner is input and displayed, from the plurality of conversion candidates displayed in the second area 200 that is displayed above the third area 300. However, the sixth operation is not limited thereto, and a katakana character " ア " (pronounced as "a") displayed in the right corner may be input and displayed, and any character displayed in the second area 200 may be input and displayed. In the sixth operation, even if the upper key 111 is not operated, in a case in which the determination key 11c is operated in a state where the third area 300 is selected, the kanji character " 亜 " ("a") may be input from the plurality of conversion candidates in the second area 200. In the sixth operation, the entire second area 200 may be selected instead of a single conversion candidate from a plurality of conversion candidates in the second area 200.

In the sixth operation, in a state where the third area 300 is selected, in a case in which the determination key 11c is operated, and the upper direction is designated by the upper key 111, a single conversion candidate is selected from a plurality of conversion candidates in the second area 200 that is displayed above the third area 300. However, in the sixth operation, in a case in which the determination key 11c is operated, and any of the lower key 112, the right key 113 and the left key 114 is operated, a single conversion candidate may be selected from a plurality of conversion candidates in the second area 200 that is displayed above the third area 300.

In the sixth operation, in a state where the third area 300 is selected, in a case in which the determination key 11c is not operated, and the upper direction is designated by the upper key 111, the hiragana character "o" displayed in the lower right corner is input, from the plurality of conversion candidates displayed in the first area 100 that is displayed below the third area 300. However, the sixth operation is not limited thereto, and the hiragana character "a" displayed in the upper right corner may be input again, and any character displayed in the first area 100 may be input. In the sixth operation, the entire first area 100 may be selected instead of a single character from a plurality of characters in the first area 100.

In the sixth operation, in a state where the third area 300 is selected, in a case in which the determination key 11c is not operated, and the upper direction is designated by the upper key 111, a single character is selected from a plurality of characters in the first area 100 that is displayed below the third area 300. However, in the sixth operation, in a case in which the determination key 11c is not operated, and any of the lower key 112, the right key 113 and the left key 114 is operated, a single character may be selected from a plurality of characters in the first area 100 that is displayed below the third area 300.

In the sixth operation, in a state where the hiragana character " あ " ("a") is displayed in the upper right corner of the first area 100 (see the first area 100 in FIG. 15 regarding the layout of characters), in a case in which the upper direction is designated by the upper key 111, the third area 300 is selected since there is no character in the upper direction from the hiragana character " あ " ("a") (see FIG. 16C). However, the sixth operation is not limited thereto, and in a state where the hiragana character " お " ("o") being displayed in the lower right corner is selected (see the first area 100 in FIG. 15 regarding the layout of characters), in a case in which the lower direction is selected by the lower key 112, the third area 300 is selected since there is no character in the lower direction from the hiragana character " お " ("o"). Furthermore, in the sixth operation, in a case in which the right direction is designated by the right key 113, the third area 300 is selected since there is no character in the right direction from the hiragana character " お " ("o").

Next, descriptions are provided for a seventh operation of the mobile telephone device 1 with reference to FIG. 17. First of all, the seventh operation postulates that a kanji character " 亜 " ("a") is displayed on the display unit 21 (see FIG. 17A). The display unit 21 displays: the first area 100 for displaying a plurality of characters that can be selected as input characters; the second area 200 for displaying conversion candidates for the hiragana character " あ " ("a"); and the third area 300 that is adjacent to the first area 100 and the second area 200 (see FIG. 17A).

As shown in FIG. 17A, in a state where the kanji character " 亜 " ("a") being displayed in the upper left corner of the second area 200 is selected, in a case in which the left direction is designated by the left key 114, since there is no character in the left direction from the kanji character " 亜 " ("a"), the control unit 45 controls that the third area 300 is selected (see FIG. 17B).

In a state where the third area 300 is selected, in a case in which the determination key 11c is operated, and the lower direction is designated by the lower key 112, the control unit 45 controls that the hiragana character " あ " ("a") displayed in the upper right corner is selected by the cursor 50 from a plurality of characters in the first area 100 that is displayed below the third area 300, and the hiragana character " あ " ("a") is displayed in the character input area 400 of the display unit 21 (see FIG. 17C).

In a state where the third area 300 is selected by the cursor 50, in a case in which the determination key 11c is not operated, and the lower direction is designated by the lower key 112, the control unit 45 controls that a katakana character " ア " ("a") displayed in the lower right corner is selected by the cursor 50 from a plurality of conversion candidates in the second area 200 that is displayed above the third area 300, and the katakana character " ア " ("a") is displayed in the character input area 400 of the display unit (see FIG. 17D). A so-called toggle operation is performed.

In this manner, in a case in which a desired character is input by using the direction designation keys 11a, in a state where the third area 300 is selected, the mobile telephone device 1 determines whether the first area 100 or the second area 200 is selected, based on whether the determination key 11c is operated or any of the direction designation keys 11a is operated without operating the determination key 11c. Thus, the first area and the second area can be separately used. Therefore, the user can easily input a desired character.

Here, in the seventh operation, a character is input as selected by the cursor 50. However, the seventh operation is not limited thereto, and a character may be input only when a key such as the determination key is operated after selecting the character by the cursor 50. It is preferable for the determination key to be a center key, which is the so-called determination key 11c surrounded by the direction designation keys, but it is not limited thereto.

In the seventh operation, in a state where the third area 300 is selected, in a case in which the determination key 11*c* is operated, and the lower direction is designated by the lower key 112, the hiragana character "a" displayed in the upper right corner is input, from the plurality of characters displayed in the first area 100 that is displayed below the third area 300. However, the seventh operation is not limited thereto, and the hiragana character "o" displayed in the lower right corner may be input, and any character displayed in the first area 100 may be input. In the seventh operation, even if the lower key 112 is not operated, in a case in which the determination key 11*c* is operated in a state where the third area 300 is selected, the hiragana character "a" being displayed in the upper right corner may be input from the plurality of characters in the first area 100. In the seventh operation, the entire first area 100 may be selected instead of a single character from a plurality of characters in the first area 100.

In the seventh operation, in a state where the third area 300 is selected, in a case in which the determination key 11*c* is operated, and the lower direction is designated by the lower key 112, a single character is selected from a plurality of characters in the first area 100 that is displayed below the third area 300. However, in the seventh operation, in a case in which the determination key 11*c* is operated, and any of the upper key 111, the right key 113 and the left key 114 is operated, a single character may be selected from a plurality of characters in the first area 100 that is displayed below the third area 300.

In the seventh operation, in a state where the third area 300 is selected, in a case in which the determination key 11*c* is not operated, and the lower direction is designated by the lower key 112, the katakana character "a" displayed in the lower right corner is input and displayed, from the plurality of conversion candidates displayed in the second area 200 that is displayed above the third area 300. However, the seventh operation is not limited thereto, and the kanji character "a" displayed in the upper left corner may be input again, and any character displayed in the second area 200 may be input. In the seventh operation, the entire second area 200 may be selected instead of a single conversion candidate from a plurality of conversion candidates in the second area 200.

In the seventh operation, in a state where the third area 300 is selected, in a case in which the determination key 11*c* is not operated, and the lower direction is designated by the lower key 112, a single conversion candidate is selected from a plurality of conversion candidates in the second area 200 that is displayed above the third area 300. However, in the seventh operation, in a case in which the determination key 11*c* is not operated, and any of the upper key 111, the right key 113 and the left key 114 is operated, a single conversion candidate may be selected from a plurality of conversion candidates in the second area 200 that is displayed above the third area 300.

In the seventh operation, in a state where the kanji character " 亜 " ("a") being displayed in the upper left corner of the second area 200 is selected, in a case in which the left direction is designated by the left key 114, since there is no character in the left direction from the kanji character " 亜 " ("a"), the third area 300 is selected (see FIG. 17B). However, the seventh operation is not limited thereto, and in a state where a kanji character " 蛙 " (pronounced as "kaeru") being displayed in the lower left corner is selected, in a case in which the left direction is designated by the left key 114, since there is no character in the left direction from the kanji character " 蛙 " ("kaeru"), the third area 300 is selected.

In the sixth operation, in a case in which the determination key 11*c* is operated, and any of the direction designation keys 11*a* is operated, a single conversion candidate is selected from a plurality of conversion candidates in the second area 200. In the seventh operation, in a case in which the determination key 11*c* is operated, and any of the direction designation keys 11*a* is operated, a single character is selected from a plurality of characters in the first area 100. However, each of the operation examples is not limited thereto. In the sixth operation, in a case in which the determination key 11*c* is operated, and any of the direction designation keys 11*a* is operated, a single character may be selected from a plurality of characters in the first area 100. In the seventh operation, in a case in which the determination key 11*c* is operated, and any of the direction designation keys 11*a* is operated, a single conversion candidate may be selected from a plurality of conversion candidates in the second area 200.

Similarly, in the sixth operation, in a case in which the determination key 11*c* is not operated, and any of the direction designation keys 11*a* is operated, a single character is selected from a plurality of character in the first area 100. In the seventh operation, in a case in which the determination key 11*c* is not operated, and any of the direction designation keys 11*a* is operated, a single conversion candidate is selected from a plurality of conversion candidates in the second area 200. However, each of the operation examples is not limited thereto. In the sixth operation, in a case in which the determination key 11*c* is not operated, and any of the direction designation keys 11*a* is operated, a single conversion candidate may be selected from a plurality of conversion candidates in the second area 200. In the seventh operation, in a case in which the determination key 11*c* is not operated, and any of the direction designation keys 11*a* is operated, a single character may be selected from a plurality of characters in the first area 100.

In the sixth or seventh operation, in a state where the character palette for displaying characters of the Japanese syllabary based on vowels and consonants is displayed in the first area 100 (see the first area 100 in FIG. 15), in a case in which a character displayed in the first area 100 is selected after selecting the third area 300, the character may be selected such that the character has the same vowel or consonant as that of a character selected in the first area 100 immediately before selecting the third area 300, and is different from the character that was selected.

Figure 15:
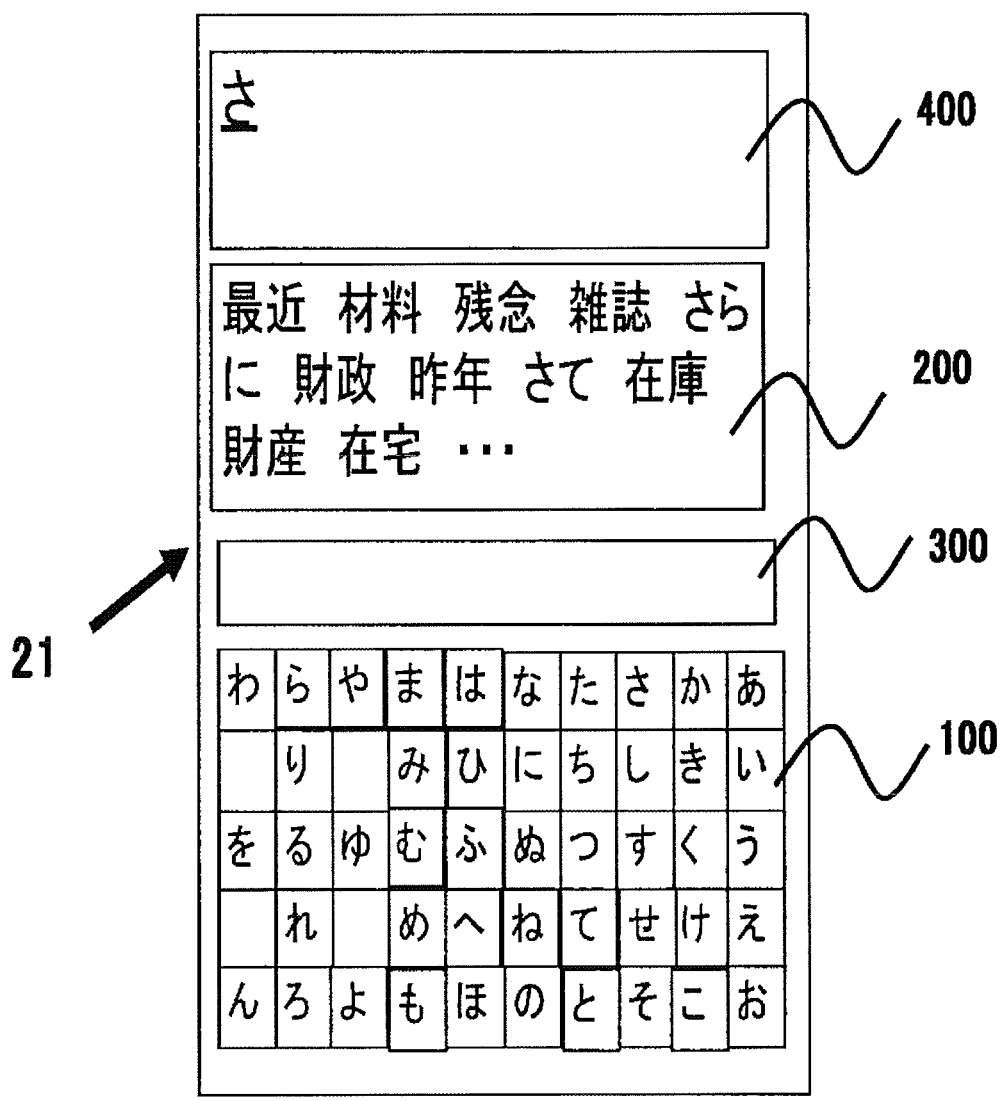
FIG. 15 is a diagram showing an example of a first area, a second area, a third area and a character input area, which are displayed on a display unit of the mobile telephone device.

More specifically, in each of the operation examples, in a case in which a hiragana character "a" is selected from a plurality of characters in the first area 100, the third area 300 is selected, and an other character in the first area 100 is further selected, the other character may be selected such that the other character has the same vowel as that of the hiragana character " あ " ("a") selected in the first area immediately before selecting the third area 300, and the other character is different from the hiragana character " あ " ("a") that was selected, i.e. any of hiragana characters " か " ("ka"), " さ " (pronounces as "sa"), " た " (pronounces as "ta"), " な " (pronounces as "na"), " は " (pronounces as "ha"), " ま " (pronounces as "ma"), " や " (pronounces as "ya"), " ら " (pronounces as "ra") and " わ " (pronounces as "wa") may be selected (see the first area 100 in FIG. 15 regarding the layout of the characters). In each of the operation examples, in a case in which the hiragana character " あ " ("a") is selected from a plurality of characters in the first area 100, the third area 300 is selected, and an other character in the first area 100 is further selected, the other character may be selected such that the other character has the same consonant as that of the hiragana character " あ " ("a") selected in the first area immediately before selecting the third area 300, and the other character is different from the hiragana character " あ " ("a")

that was selected, i.e. any of hiragana characters "い" ("i"), "う" (pronounced as "u"), "え" (pronounced as "e") and "お" ("o") may be selected (see the first area 100 in FIG. 15 regarding the layout of the characters).

The present invention is not limited to the aforementioned embodiment, and can be implemented as various embodiments.

Although the aforementioned embodiment has been described for a case in which the mobile telephone device 1 is configured with a single direction designation key 11a (composed of the upper key 111, the right key 113, the lower key 112 and the left key 114), the present invention is not limited to this configuration. Therefore, the direction designation keys may be composed of a plurality of keys. In other words, the upper key, the right key, the lower key and the left key may be mutually independent keys.

Although the aforementioned embodiment has been described for a case in which the direction designation keys 11a are composed of hardware keys, the present invention is not limited to this configuration. In other words, in a case of a touch panel including a touch sensor, the direction designation keys may be displayed as software keys on the touch panel.

Although the mobile telephone device and the like have been described above as the embodiments, the embodiments are intended to facilitate understanding of the present invention, and are not intended to interpret the present invention in a limited manner. Needless to mention, the present invention may be altered and/or improved without departing from the spirit thereof, and the present invention includes equivalents thereof. In particular, the present invention also includes an embodiment described below.

For example, the mobile telephone device 1 according to the first embodiment and the mobile telephone device 1 according to the second embodiment can be implemented in a crossover manner. In other words, the mobile telephone device can perform both of the operations described in the first embodiment and the operations described in second embodiment.

Moreover, the aforementioned embodiments have been described by illustrating the cases in which the present invention is applied to the mobile telephone device 1. However, the present invention is not limited to the aforementioned embodiments, and may also be applied to an electronic device such as a PHS (Personal Handyphone System), a PDA (Personal Digital Assistant), a personal computer, a portable gaming device, a navigation device, or a remote controller.

The invention claimed is:

1. An electronic device, comprising:
a display unit;
an operation unit capable of designating a plurality of directions; and
a control unit, wherein, in a state where a non-numeric character and a numeric character are displayed on the display unit, in a case in which any direction is designated by the operation unit, the control unit selects an other non-numeric character and an other numeric character for changing at least one of the non-numeric character and the numeric character displayed on the display unit to the other non-numeric character and the other numeric character, respectively, and causes the display unit to display the other non-numeric character and the other numeric character thus selected,
wherein the operation unit is capable of designating a first direction, a second direction that is a direction opposite to the first direction, a third direction that is a direction transverse to the first direction, and a fourth direction that is a direction opposite to the third direction,
wherein, in a state where the non-numeric character and the numeric character are displayed on the display unit, in a case in which the first direction or the second direction is designated by the operation unit, the control unit selects an other non-numeric character and an other numeric character for changing the non-numeric character and the numeric character displayed on the display unit to the other non-numeric character and the other numeric character, respectively, and causes the display unit to display the other non-numeric character and the other numeric character thus selected, and
wherein, in a state where the non-numeric character and the numeric character are displayed on the display unit, in a case in which the third direction or the fourth direction is designated by the operation unit, the control unit selects an other non-numeric character for changing the non-numeric character displayed on the display unit to the other non-numeric character, causes the display unit to display the other non-numeric character thus selected, and maintains displaying of the numeric character as displayed on the display unit.

2. The electronic device according to claim 1,
wherein, in a case in which the non-numeric character and the numeric character are displayed on the display unit, the control unit causes the display unit to display a non-numeric character input area for displaying the non-numeric character, and a numeric character input area for displaying the numeric character, and
wherein, in a case in which the third direction or the fourth direction is designated by the operation unit, the control unit maintains displaying of the non-numeric character input area for displaying the non-numeric character as well as the non-numeric character thus displayed, and cancels displaying of the numeric character input area for displaying the numeric character as well as the numeric character thus displayed.

3. An electronic device, comprising:
an operation unit capable of designating a plurality of directions, and performing a determination operation;
a display unit that displays: a first area for displaying a plurality of characters that can be selected as input characters; a second area for displaying a predictive candidate or a conversion candidate for the characters thus input; and a third area that is adjacent to the first area and the second area; and
a control unit,
wherein, in a state where a character displayed in the first area is selected, in a case in which there is no character in a direction designated by operating the operation unit, the control unit selects the third area, and
wherein, in a state where the third area is selected, in a case in which a determination operation is performed by the operation unit, the control unit selects the second area or the conversion candidate or the prediction candidate displayed in the second area, and in a case in which any direction is designated by the operation unit, the control unit selects the first area or the character displayed in the first area.

4. An electronic device, comprising:
an operation unit capable of designating a plurality of directions, and performing a determination operation;
a display unit that displays: a first area for displaying a plurality of characters that can be selected as input characters; a second area for displaying a predictive candidate or a conversion candidate for the characters thus input; and a third area that is adjacent to the first area and the second area; and wherein, in a state where a character displayed in the first area is selected, in a case in which there is no character in a direction designated by operating the operation unit, the control unit selects the third area, and wherein, in a state where the third area is selected, in a case in which a determination operation is performed by the operation unit, the control unit selects the first area or the character displayed in the first area, and in a case in which any direction is designated by the operation unit, the control unit selects the second area or the conversion candidate or the prediction candidate displayed in the second area.

5. The electronic device according to claim 3, wherein, in a state where the conversion candidate or the predictive candidate displayed in the second area is selected, in a case in which there is no conversion candidate or predictive candidate in a direction designated by operating the operation unit, the control unit selects the third area.

6. The electronic device according to claim 3, wherein a character palette for displaying characters of a Japanese syllabary based on vowels and consonants is displayed in the first area, and wherein, in a case in which the character displayed in the first area is selected after selecting the third area, the control unit selects a character, which has a vowel or consonant identical to that of a character selected in the first area immediately before selecting the third area, and which is different from the character that was selected.

7. The electronic device according to claim 3, wherein a character is associated with each direction that can be designated by the operation unit, and wherein, in a state where a standard screen is displayed on the display unit, in a case in which any direction is designated by the operation unit, the control unit causes the display unit to display a character associated with the direction thus designated.

8. The electronic device according to claim 4, wherein, in a state where the conversion candidate or the predictive candidate displayed in the second area is selected, in a case in which there is no conversion candidate or predictive candidate in a direction designated by operating the operation unit, the control unit selects the third area.

9. The electronic device according to claim 4, wherein a character palette for displaying characters of a Japanese syllabary based on vowels and consonants is displayed in the first area, and wherein, in a case in which the character displayed in the first area is selected after selecting the third area, the control unit selects a character, which has a vowel or consonant identical to that of a character selected in the first area immediately before selecting the third area, and which is different from the character that was selected.

10. The electronic device according to claim 4, wherein a character is associated with each direction that can be designated by the operation unit, and wherein, in a state where a standard screen is displayed on the display unit, in a case in which any direction is designated by the operation unit, the control unit causes the display unit to display a character associated with the direction thus designated.

* * * * *